United States Patent [19]  [11] 4,414,379
Koyama et al.  [45] Nov. 8, 1983

[54] GRANULAR OR POWDERY NITROGEN-CONTAINING PHENOL-ALDEHYDE COPOLYMER RESIN AND PROCESS FOR PRODUCTION THEREOF

[75] Inventors: Hiroaki Koyama, Kobe; Shigeo Shimizu, Osaka, both of Japan

[73] Assignees: Kanebo Ltd.; Mitsubishi Chemical Industries Limited, both of Tokyo, Japan

[21] Appl. No.: 388,974

[22] Filed: Jun. 16, 1982

[30] Foreign Application Priority Data

Jul. 24, 1981 [JP] Japan .................. 56-115376

[51] Int. Cl.$^3$ .................. C08G 14/06; C08G 14/08; C08G 14/10
[52] U.S. Cl. .................. 528/137; 525/495; 525/498; 528/142; 528/146; 528/153; 528/155; 528/156; 528/157; 528/162; 528/163; 528/164; 528/165
[58] Field of Search .............. 528/137, 142, 146, 153, 528/155, 156, 157, 162, 163, 164, 165; 525/495, 498

[56] References Cited

U.S. PATENT DOCUMENTS

| | | | |
|---|---|---|---|
| 3,419,527 | 12/1968 | Akutin et al. | 528/137 |
| 3,558,559 | 1/1971 | LeBlanc | 528/162 |
| 4,046,734 | 9/1977 | Zimmerli | 528/165 X |
| 4,169,937 | 10/1979 | Vargiu et al. | 528/162 X |
| 4,317,901 | 3/1982 | Cosway | 528/137 X |
| 4,319,016 | 3/1982 | Kurobe et al. | 528/163 X |
| 4,336,179 | 6/1982 | Iyer | 528/165 X |
| 4,366,303 | 12/1982 | Kopf | 528/162 X |

*Primary Examiner*—Howard E. Schain
*Attorney, Agent, or Firm*—Sherman & Shalloway

[57] ABSTRACT

A granular or powdery nitrogen-containing phenol-aldehyde copolymer resin which is a condensation product of a phenol, a nitrogen-containing compound having at least two active hydrogen atoms and an aldehyde, said granular or powdery resin being characterized by (A) containing spherical primary particles and secondary particles resulting from the agglomeration of the primary particles, each of said particles having a particle diameter of 0.1 to 100 microns,
(B) having such a size that at least 50% by weight thereof can pass through a 150 Tyler mesh sieve,
(C) having a free phenol content, determined by liquid chromatography, of not more than 50 ppm, and
(D) having a $D_{960-1020}/D_{1450-1500}$ ratio of from 0.1 to 2.0 in its infrared absorption spectrum.

The granular or powdery nitrogen-containing phenol-aldehyde copolymer resin may be produced by a process which comprises contacting a phenol and a nitrogen-containing compound having at least two active hydrogen atoms with a hydrochloric acid-formaldehyde bath containing 3 to 28% by weight of hydrochloric acid, 3 to 25% by weight of formaldehyde and 0 to 10% by weight of another aldehyde with the total concentration of hydrochloric acid and formaldehyde being 10 to 40% by weight, while maintaining a bath ratio, defined by the quotient of the weight of the hydrochloric acid-formaldehyde bath divided by the total weight of the phenol and the nitrogen-containing compound, of at least 8, said contacting being effected such that after contacting of the phenol and the nitrogen-containing compound with the bath, white suspended particles are formed and thereafter developed into a granular or powdery solid.

69 Claims, 11 Drawing Figures

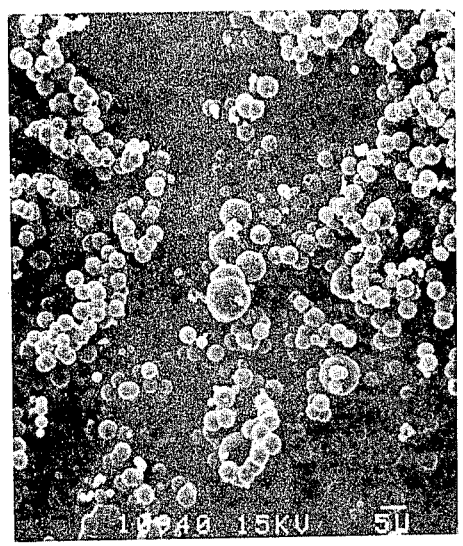
Fig. 1-A
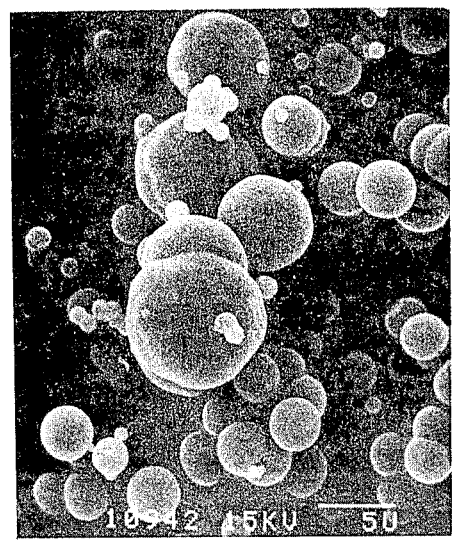
Fig. 1-B

Fig. 2-A
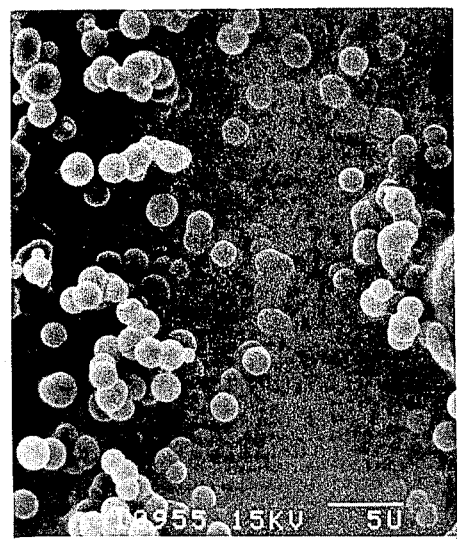
Fig. 2-B

Fig. 3-A
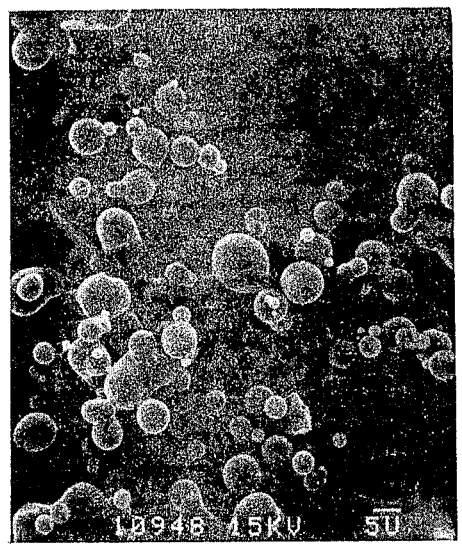
Fig. 3-B
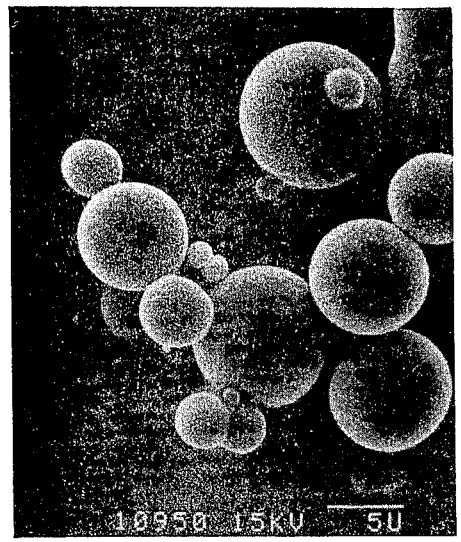

Fig. 4-A
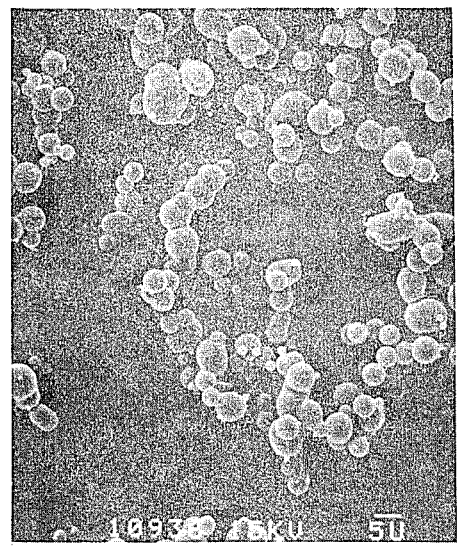
Fig. 4-B
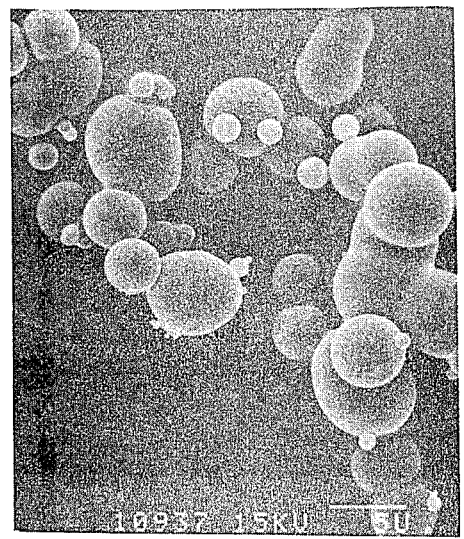

Fig. 5-A
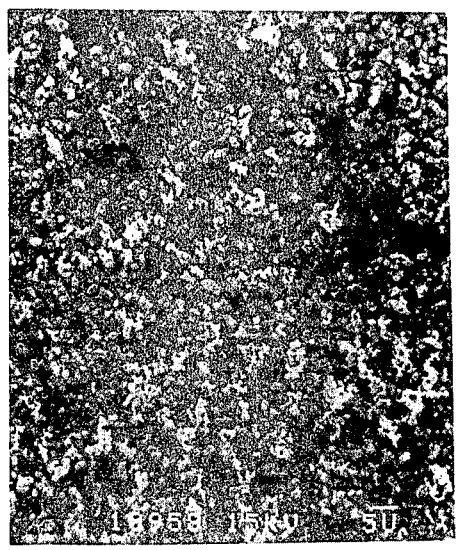
Fig. 5-B
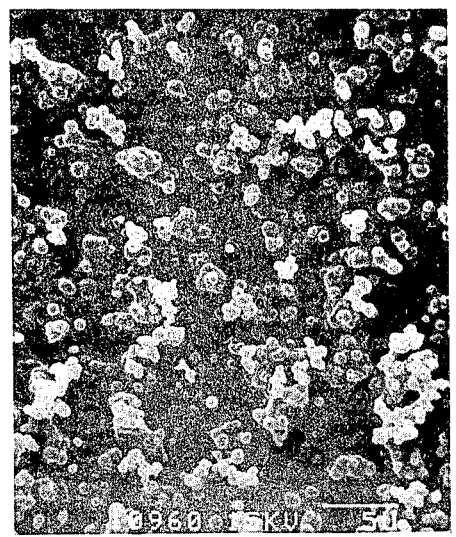

GRANULAR OR POWDERY NITROGEN-CONTAINING PHENOL-ALDEHYDE COPOLYMER RESIN AND PROCESS FOR PRODUCTION THEREOF

BACKGROUND OF THE INVENTION

1. Field of the Invention

This invention relates to a novel granular or powdery nitrogen-containing phenol-aldehyde copolymer resin and a process for its production. More specifically, it relates to a novel granular or powdery nitrogen-containing phenol-aldehyde copolymer resin which has reactivity and good storage stability and flow characteristics and is suitable as a molding material, and to a novel process for its production.

2. Description of the Prior Art

Typical known phenol-formaldehyde resins are novolak resins and resol resins.

The novolak resins are usually produced by reacting an excess of phenol with formaldehyde in the presence of an acid catalyst such as oxalic acid (usually in an amount of 0.2 to 2% by weight based on the phenol) while maintaining the mole ratio of phenol to formaldehyde at, for example, 1:0.7–0.9. The novolak resins so produced have no self-crosslinkability and are thermoplastic because they are composed of, as main components, tri-, tetra- and pentamers resulting from the bonding of phenol moieties mainly by methylene groups and contain almost no methylol groups. The novolak resins can be converted to cured resins by, for example, reacting them under heat with a crosslinking agent, such as hexamine (hexamethylenetetramine), which is at once a formaldehyde generator and an organic base (catalyst) generator, or by mixing them with a solid acid catalyst and paraformaldehyde and reacting them under heat. When such a novolak resin in accordance with the former method is used as a molding material, the resulting molded article will be foamed owing to the generation of ammonia by the decomposition of hexamine or the undecomposed part of hexamine, or an organic base formed as a by-product will remain in the molded article. This causes the defect that the properties of the molded articles are changed or deteriorated, and the curing reaction is time-consuming. According to the latter curing method, those parts of the novolak resin which make contact with the paraformaldehyde and the acid catalyst undergo excessive crosslinking reaction, and it is difficult to cure the resin uniformly. Furthermore, the acid catalyst or paraformaldehyde remains in the molded article to degrade its properties with the lapse of time, or troubles such as foaming occur owing to the decomposition of the acid catalyst or paraformaldehyde during curing. Another defect is that when the novolak resin is to be mixed with another resin, hexamine, the acid catalyst, paraformaldehyde, etc. remaining in it deteriorate the other resin, and that the novolak resin contains a relatively large amount (for example, about 0.5 to 2% by weight) of free phenol because of the use of an excess of phenol as a starting material.

A process for producing cured novolak resin fibers was recently suggested which comprises heating a novolak resin at a high temperature to form a product having a considerably high degree of condensation, purifying the product by removing components having a low degree of condensation to obtain a product having a relatively high degree of condensation and containing phenol moieties linked to each other by 7 to 10 methylene groups, melt spinning the product to form novolak fibers, dipping the fibers in an aqueous solution of hydrochloric acid and formaldehyde and gradually heating the solution from room temperature to allow curing reaction to proceed from the surface of the fibers (Japanese Patent Publication No. 11284/1973). This process requires an extra step for the formation of the novolak resin having a high degree of condensation. Furthermore, when this resin is pulverized without being converted to fibers, and subjected to an external curing treatment, it is almost impossible to allow the curing reaction to proceed uniformly to the interior of the resin. Granules or pwoders obtained by cutting or pulverizing the cured fibers are expensive, and do not possess good flow characteristics.

On the other hand, the known resol resins are produced usually by reacting phenol with an excess of formaldehyde in the presence of a basic catalyst (about 0.2 to 2% by weight based on the phenol) such as sodium hydroxide, ammonia or an organic amine while maintaining the mole ratio of phenol to formaldehyde at, for example, 1:1–2. The resol resins so produced contain mono-, di- and trimers of phenol having a relatively large amount of methylol groups as main components and are very reactive. It is the usual practice therefore to store them in a refrigerator as a water or methanol solution having a solid concentration of not more than 60%. The period for which such storage is possible is about 3 to 4 /months at the longest. To mold and cure such a resol resin, the water or methanol is removed and the resin is heated in the optional presence of an acid catalyst. The rate of this curing reaction is very high, and, for example at 150° C., gellation occurs within several tens of seconds.

Since the resol resin has very high reactivity, it cannot be obtained as a stable granular or powdery solid. Furthermore, because a cured product of the resol resin has a highly developed three-dimensional structure, it is very hard and its conversion to a fine granular or powdery molding material is quite difficult (Japanese Patent Publication No. 12958/1978).

A method is also known which comprises reacting a mixture of phenol, formaldehyde and urea in the presence of an alkaline catalyst to prepare a modified resol resin and then condensing the modified resol resin further in the presence of an acid catalyst to produce a thermosetting resol/novolak type phenolic resin (Japanese Patent Publication No. 993/1957). According to this method, the alkaline catalyst must be exchanged with the acid catalyst during the reaction, and it is difficult to control the reaction operation, for example to select a suitable time of this catalyst exchanging. This Patent Publication states that the resin obtained by this method is easy to pulverize.

Several years ago, a process was disclosed which comprises reacting a phenol and formaldehyde in the presence of at least a nitrogen-containing compound as a catalyst, and reacting the resulting condensate with a hydrophilic polymeric compound to form a granular or powdery resin (Japanese Patent Publication No. 42077/1978). The resulting resin in the non-gelled state contains as much as about 5 to 6% of free phenol (Examples 1 to 4 of the cited Japanese patent document), and a gelled product of the resin (Example 5 of the Japanese patent document) is a very hard non-reactive resin. Molded articles obtained from the gelled resin have deteriorated properties because of its inclusion of the nitrogen-containing compound used as catalyst or the hydrophilic polymeric compound.

A process is also known which comprises reacting a phenol and formaldehyde in a basic aqueous solution, mixing the resulting prepolymer with a protective colloid, and coagulating the prepolymer under acidity to form inert solid beads (Japanese Patent Publication No. 13491/1976). The coagulated product corresponds to a cured product of a resol resin, and has no reactivity. Furthermore, since it contains a salt or acid and the protective colloid, molded articles prepared from it have degrated properties.

SUMMARY OF THE INVENTION

A first object of this invention is to provide a nitrogen-containing phenol-aldehyde copolymer resin which is finer in particle size and greater flow characteristics and thermal stability than the substantially nitrogen-free granular or powdery phenol-formaldehyde resin previously suggested by the present inventors (Japanese Patent Application No. 60613/1981).

A second object of this invention is to provide a granular or powdery phenol-aldehyde copolymer resin which has high storage stability and good flow characteristics, and is reactive when heated singly or in admixture with another resin.

A third object of this invention is to provide a nitrogen-containing phenol-aldehyde copolymer resin which is in the form of a very fine granular or powdery solid and therefore has good flow characteristics and, for example, can be smoothly passed through minute nozzles in injection molding and which can be used as a reactive filler.

A fourth object of this invention is to provide a granular of powdery nitrogen-containing phenol-aldehyde copolymer resin which has fusibility under heat, for example at 100° C.

A fifth object of this invention is to provide a granular or powdery nitrogen-containing phenol-aldehyde copolymer resin which has a free phenol content of as low as not more than 50 ppm, is safe and easy to handle and does not give rise to a pollution problem.

A sixth object of this invention is to provide a granular or powdery nitrogen-containing phenol-aldehyde copolymer resin which has good storage stability at ordinary temperature, and either singly or together with another resin can be molded into an article having superior heat resistance, water resistance, alkali resistance, arc resistance, thermal insulation, mechanical properties and/or electrical properties.

An additional object of this invention is to provide a novel industrial process for producing a novel granular or powdery nitrogen-containing phenol-aldehyde copolymer resin having the various advantages given in the above description of the first to sixth objects of the invention.

These objects and advantages are achieved in accordance with this invention by a granular or powdery nitrogen-containing copolymer resin which is a condensation product of a phenol, a nitrogen-containing compound having at least two active hydrogen atoms and an aldehyde, said granular or powdery resin being characterized by (A) containing spherical primary particles and secondary particles resulting from the agglomeration of the primary particles, each of said particles having a particle diameter of 0.1 to 100 microns, (B) having such a size that at least 50% by weight thereof can pass through a 150 Tyler mesh sieve, (C) having a free phenol content, determined by liquid chromatography, of not more than 50 ppm, and (D) having a $D_{960-1020}/D_{1450-1500}$ ratio of from 0.1 to 2.0 in its infrared absorption spectrum measured by a KBr tablet method, wherein $D_{960-1020}$ represents the highest absorption intensity of absorption peaks at 960 to 1020 cm$^{-1}$ assigned to the methylol groups, and $D_{1450-1500}$ represents the highest absorption intensity of absorption peaks at 1450 to 1500 cm$^{-1}$ assigned to the aromatic double bond.

Furthermore, the above objects and advantages of this invention are advantageously achieved by the aforesaid copolymer resin which has a $D_{1280-1360}/D_{1450-1500}$ ratio of from 0.15 to 3.0 in its infrared absorption spectrum measured by a KBr method, wherein $D_{1280-1360}$ is the highest absorption intensity of absorption peaks at 1280 to 1360 cm$^{-1}$ assigned to the carbon-nitrogen bond and $D_{1450-1500}$ is as defined above.

We have found that the novel granular or powdery nitrogen-containing phenol-aldehyde resin of the invention can be produced by a process which comprises contacting a phenol and a nitrogen-containing compound having at least two active hydrogen atoms with a hydrochloric acid-formaldehyde bath containing 3 to 28% by weight of hydrochloric acid, 3 to 25% by weight of formaldehyde and 0 to 10% by weight of another aldehyde with the total concentration of hydrochloric acid and formaldehyde being 10 to 40% by weight, while maintaining a bath ratio, defined by the quotient of the weight of the hydrochloric acid-formaldehyde bath divided by the total weight of the phenol and the nitrogen-containing compound, of at least 8, said contacting being effected such that after contacting of the phenol and the nitrogen-containing compound with the bath, white suspended particles are formed and thereafter developed into a granular or powdery solid.

BRIEF DESCRIPTION OF THE DRAWINGS

FIGS. 1A to 5A are microphotographs of the granular or powdery resin of the invention taken through a scanning electron microscope with a magnification of 1000, in which the minimum marked interval of the scale is 5μ;

FIGS. 1B to 5B are microphotographs of the granular or powdery resin of the invention taken through a scanning electron microscope with a magnification of 3000, in which the minimum marked interval of the scale is 5μ.

DETAILED DESCRIPTION OF THE INVENTION

[Process]

Figure 6:
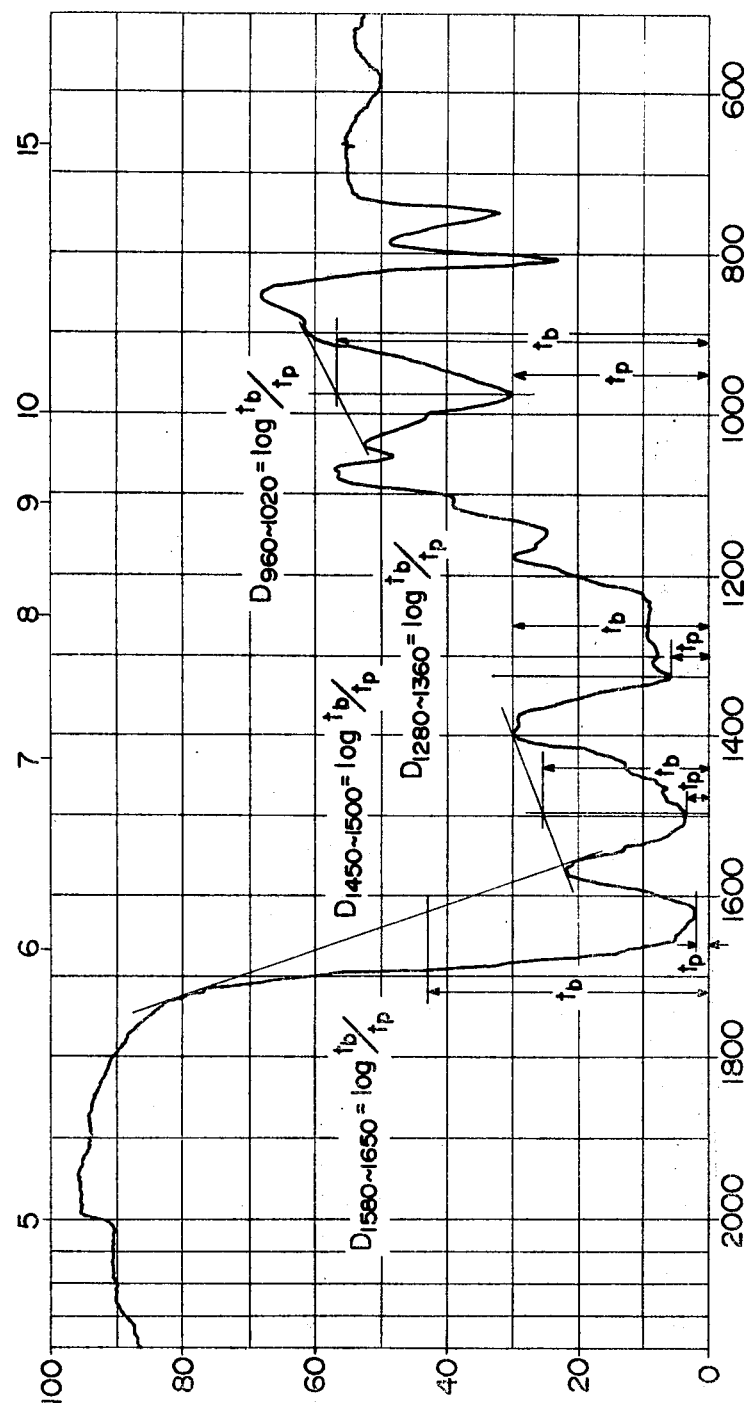
FIG. 6 is an infrared absorption spectral chart of the granular or powdery resin of the invention, and also shows how to determine the absorption intensity of a peak at a given wavelength.

According to the process of this invention, a phenol and a nitrogen-containing compound having at least two active hydrogens are contacted with a hydrochloric acid-formaldehyde bath containing (a) 3 to 28% by weight of hydrochloric acid, (b) 3 to 25% by weight of formaldehyde and 0 to 10% by weight of another aldehyde, (c) with the total concentration of hydrochloric acid and formaldehyde being 10 to 40% by weight, while maintaining a bath ratio, defined by the quotient of the weight of the hydrochloric acid-formaldehyde bath divided by the total weight of the phenol and the nitrogen-containing compound, of at least 8.

Preferably, the hydrochloric acid-formaldehyde bath further meets the requirement (d) that the mole ratio of the formaldehyde in the bath to the phenol and the nitrogen-containing compound contacted with the bath should be at least 2, especially at least 2.5, above all at least 3. There is no particular upper limit to the mole ratio specified by the requirement (d), but preferably it is 20, especially 15. Molar ratios above the preferred upper limit are not economically advantageous. On the other hand, when the mole ratio decreases below 2.5, especially below 2, the rate of the reaction decreases, and a uniform and fine granular or powdery resin is difficult to obtain. The especially suitable range of the mole ratio is from 4 to 15. Molar ratios of at least 2, preferably at least 2.5, are especially effective when the bath ratio is relatively low, for example from 8 to 10.

In the present invention, the contacting of the phenol and the nitrogen-containing compound with the HCl-formaldehyde bath is effected while maintaining the bath ratio of the bath at 8 or more, preferably 10 or more. The important feature of the present invention is that the HCl-formaldehyde bath having a considerably high HCl concentration and containing formaldehyde in molar excess of the sum of the phenol and the nitrogen-containing compound is contacted with the phenol and the nitrogen-containing compound at a bath ratio of as high as at least 8, preferably at least 10.

Since the process of this invention is carried out under such conditions that the concentration of each of hydrochloric acid and formaldehyde is at least 3% by weight of the bath ratio is at least 8, the ratio of each of hydrochloric acid and formaldehyde based on the total weight of the phenol and the nitrogen compound is at least 24% by weight. Furthermore, since the process of this invention is carried out while the total concentration of hydrochloric acid and formaldehyde is maintained at 10% by weight or higher, the ratio of the sum of hydrochloric acid and formaldehyde based on the total weight of the phenol and the nitrogen-containing compound is at least 80% by weight. These conditions for the reaction of the phenol with formaldehyde are basically different from the reaction conditions for the production of the known novolak resins and resol resins.

In the HCl-formaldehyde bath used in this invention, the preferred concentration of hydrochloric acid is 8 to 25% by weight, especially 12 to 22% by weight; the preferred concentration of formaldehyde is 5 to 20% by weight, especially 7 to 15% by weight; and the preferred total concentration of HCl and formaldehyde is 15 to 35% by weight, especially 20 to 32% by weight.

Preferably, the bath ratio to be maintained during the contacting of the HCl-formaldehyde bath with the phenol and the nitrogen-containing compound is at least 10, especially from 15 to 40.

Furthermore, according to the process of this invention, the contacting of the phenol and the nitrogen-containing compound with the HCl-formaldehyde bath is effected such that after their contacting with the bath, white suspended particles are formed and thereafter developed into a granular or powdery solid. Conveniently, this contacting is effected such that a clear solution is first formed by adding the phenol and the nitrogen-containing compound to the HCl-formaldehyde bath or by first adding the nitrogen-containing compound and the phenol, then white suspended particles are formed in the solution and thereafter developed into a granular or powdery solid. It is preferred that before the white suspended particles are formed after the addition of the phenol and the nitrogen-containing compound to the bath, the bath be stirred to form a clear, preferably uniform, solution of the phenol and the nitrogen-containing compound and the bath, and that depending upon the ratio between the phenol and the nitrogen-containing compound or the reaction conditions, the bath (reaction mixture) be not subjected to a mechanical shearing force such as stirring after the formation of the white suspended particles until the suspended particles change to a solid.

The phenol may be added as such, but if desired, it may be diluted with formalin, an aqueous solution of hydrochloric acid, water, etc. prior to the addition.

Preferably, the phenol or both the phenol and the nitrogen-containing compound are used after they are diluted with a formalin solution having a formaldehyde concentration of not more than 44% by weight, preferably 3 to 44% by weight, more preferably 20 to 40% by weight. The concentration of these compounds in the diluted solution varies greatly with the type and proportion of the phenol or the nitrogen-containing compound, and is usually 10 to 95% by weight. When only the phenol is to be diluted, its concentration in the diluted solution is preferably 70 to 90% by weight. When both the phenol and the nitrogen-containing compound are to be diluted, the total concentration of these compounds is preferably 25 to 70% by weight. It is essential in this case to control the diluted solution such that after its addition to the HCl-formaldehyde bath, the bath meets the requirements (a), (b) and (c), preferably (a), (b), (c) and (d).

The temperature of the HCl-formaldehyde bath, either as such or after having dissolved therein the nitrogen-containing compound, to which the phenol or both the phenol and the nitrogen-containing compound (or the diluted solutions thereof) are to be added, is not more than 90° C., especially not more than 70° C. If the temperature of the bath is higher than 40° C., especially higher than 50° C., the rate of the reaction of the phenol or both the phenol and the nitrogen-containing compound with formaldehyde becomes high. It is preferred in this case, therefore, to use the phenol or both the phenol and the nitrogen-containing compound as a diluted solution in the aforesaid formaldehyde solution. It is also preferred to add and contact the phenol or both the phenol and the nitrogen-containing compound or the diluted solution thereof in the form of fine streams or finest possible droplets because the rate of reaction becomes high.

When the bath temperature is higher than 40° C., especially higher than 50° C., the rate of the reaction of the phenol or both the phenol and the nitrogen-containing compound with formaldehyde becomes higher as the temperature of the bath gets higher. Within a period of as short as several minutes after the contacting or instantaneously upon the contacting, white suspended particles are formed and rapidly developed into a granular or powder solid.

The process of this invention can conveniently be divided roughly into an embodiment in which the HCl-formaldehyde bath is maintained at a temperature of 35° to 40° C. or higher, and the phenol and the nitrogen-containing compound are added to it either as such or as the aforesaid diluted solution (embodiment 1); an embodiment in which the bath is maintained at 35° to 40° C. or lower, and the phenol and the nitrogen-containing compound are added to it either as such or the aforesaid diluted solution (embodiment 2); an embodiment in which the nitrogen-containing compound is dissolved in advance in the bath, the bath is maintained at a temperature of 35° to 40° C. or higher, and then the phenol or both the phenol and the nitrogen-containing compound are added to it either as such or as the aforesaid diluted solution (embodiment 3); and an embodiment in which the nitrogen-containing compound is dissolved in advance in the bath, the bath is maintained at a temperature of 35° to 40° C. or lower, and the phenol or both the phenol and the nitrogen-containing compound are added to it either as such or as the aforesaid diluted solution (embodiment 4).

These embodiments will now be described below in detail.

Embodiment 1

The HCl-formaldehyde bath is maintained at a temperature of at least 35° C., preferably higher than 40° C. but not higher than 95° C. A solution of the nitrogen-containing compound in the phenol at a temperature higher than its melting point or a diluted solution of these reactants is added generally to the bath as fine streams or droplets, preferably as the finest possible droplets, thereby continuously forming white suspended particles the instant the fine streams or liquid droplets make contact with the bath or within several minutes after the contacting. These white suspended particles are developed into a granular or powdery nitrogen-containing phenol-aldehyde copolymer resin. When the temperature of the bath is 60° to 95° C., the reaction of the phenol, the nitrogen-containing compound and the aldehyde proceeds rapidly.

When the temperature of the bath is 60° C. or lower, it is also possible to raise the temperature of the reaction mixture to 70° to 95° C. over a suitable period of time after the formation of the white suspended particles to complete the desired reaction.

According to this embodiment, a granular or powdery nitrogen-containing phenol-formaldehyde copolymer resin having a higher degree of curing is generally obtained as the temperature of the HCl-formaldehyde bath to which the reactants are to be added is higher and the temperature of the reaction mixture before the completion of the reaction is higher.

Embodiment 2

A solution of the nitrogen-containing compound in the phenol at a temperature higher than its melting point or a diluted solution of the reactants is added to the HCl-formaldehyde bath maintained at 40° C. or lower to form a clear solution. Then, white suspended particles are formed in the solution and developed into a granular or powdery nitrogen-containing phenol-aldehyde copolymer resin.

It is especially advantageous in embodiment 2 to first add to the HCl-formaldehyde bath the phenol and the nitrogen-containing compound either as such or as their diluted solution to form a uniform solution. By controlling the reaction conditions such that white suspended particles are formed in the uniform solution and then developed into a granular or powdery solid having a very small average particle diameter.

Preferably, stirring is effected in order to form a uniform solution by adding the phenol and the nitrogen-containing compound either as such or as their diluted solution to the HCl-formaldehyde bath. It is desirable however that this stirring be stopped before the white suspended particles are formed, or as rapidly as possible after the formation of the white suspended particles begins. If the stirring is continued even after the formation of the white suspended particles, the white suspended particles frequently gather to form a sticky paste-like mass and the yield of the fine particles is correspondingly decreased.

If the temperature of the HCl-formaldehyde bath to which the phenol and the nitrogen-containing compound or their diluted solution is to be added is as low as not more than 15° C., especially not more than 10° C., and these reactants or their solution is added all at a time to the bath, a uniform solution could be formed by continuously stirring the mixture. Since, however, the rate of the reaction of the phenol and the nitrogen-containing compound with aldehyde becomes lower as the temperature of the bath becomes lower, long periods of time are required until white suspended particles are formed, and the time required for the resulting white suspended particles to grow into a stable granular or powdery solid becomes correspondingly longer. Accordingly, if the stirring is stopped after the formation of the white suspended particles, the white suspended particles settle to the bottom of the bath before they grow into stable particles, and the condensation reaction of the phenol, the nitrogen-containing compound and the aldehyde proceeds while the suspended particles are settled and accumulated in this way. Hence, a sticky paste-like or a plate-like lumpy solid results, and the amount of the desired granular or powdery product is correspondingly decreased.

For the foregoing reasons, it is preferred to maintain the HCl-formaldehyde bath at a temperature of 10° to 35° C., especially 15° to 35° C., and add the phenol and the nitrogen-containing compound or their diluted solution to the bath maintained at this temperature. According to this procedure, a uniform solution can be formed batchwise by adding required amounts of the phenol and the nitrogen-containing compound all at a time to the bath, and then white suspended particles can be formed and developed smoothly into a fine granular or powdery solid. The reaction of the phenol and the nitrogen-containing compound with the HCl-formaldehyde bath in this invention is a relatively mild exothermic reaction. Hence, by following the aforesaid conditions, the desired reaction can be carried out without involving the sedimentation and accumulation of the white suspended particles even when no particular heating by an external heating source is effected.

In embodiment 2, the white suspended particles formed turn milk-white with the lapse of time, and usually the entire reaction mixture in the bath becomes fairly deep milk-white. Thereafter, it turns white or pink depending upon the proportions of the phenol and the nitrogen-containing compound.

The white suspended particles which are formed in accordance with embodiment 2 after first forming a uniform solution by adding the phenol and the nitrogen-containing compound or their diluted solution to the HCl-formaldehyde bath maintained at 10° to 35° C., especially 15° to 35° C., may be converted to a granular or powdery solid with or without heating by an external heat source.

As stated above, when after the formation of white suspended particles in the bath, the white suspended particles are maintained in the bath with or without temperature elevation, they turn milk-white and finally grow into a granular or powdery solid. The exothermic reaction substantially ceases at some point in this stage. Since at this point the granular or powdery solid is stable, it is permissible to stir the bath again. Alternatively, after this stable state has been reached, one may filter the bath to separate the granular or powdery solid, and put the separated solid in another HCl-formaldehyde bath (to be referred to as a second bath), which preferably meets the requirements (a), (b) and (c) specified hereinabove, to complete the desired reaction. The second bath may have a lower aldehyde concentration and/or HCl concentration than the HCl-formaldehyde bath (to be referred to as a first bath) to which the phenol and the nitrogen-containing compound or their diluted solution is first added. Since the granular or powdery solid to be added to the second bath contains only a very small amount of free phenol or contains substantially no free phenol, the bath ratio of the second bath to the solid added needs not to be at least 8 as in the first bath, and may be less than 8. The temperature of the second bath is preferably not more than 90° C., but may be higher.

Because the granular or powdery solid obtained in embodiment 2 by completing the desired reaction at a temperature of less than about 50° C. after the formation of white suspended particles has not undergone sufficient curing reaction, it shows heat fusibility in a heat fusibility test at 100° C. to be described hereinbelow.

On the other hand, a granular or powdery solid, which is obtained by adding substantially all of the phenol and the nitrogen-containing compound or their diluted solution with stirring to the HCl-formaldehyde bath maintained at less than 40° C., preferably 15° to 35° C., to form a clear solution, then allowing white suspended particles to be formed with or without agitation, developing them into a granular or powdery solid with or without temperature elevation, and heating the solid at a temperature higher than 50° C., preferably at 70° to 95° C., to complete the reaction, has undergone a higher degree of curing reaction. Accordingly, such a granular or powdery solid has reduced heat fusibility or substantially no fusibility at 100° C., or shows heat fusibility at a higher temperature, for example at 200° C., or has substantially no fusibility at such a high temperature. This type of the granular or powdery solid is particularly useful as a filler to be used together with another resin.

When a diluted solution of the phenol and the nitrogen-containing compound in a specified ratio is added to the HCl-formaldehyde bath having selected concentrations, the initial-stage condensation product in the form of white suspended particles grows into a fine, thermally stable, granular or powdery solid within a very short period of time before the suspended particles are settled and adhere to the reactor vessel, etc. In this case, it is permissible to apply a shearing force, for example agitation, to the bath in which the white suspended particles are formed.

Embodiment 3

The nitrogen-containing compound is dissolved in advance in the HCl-formaldehyde bath, and the temperature of the bath is maintained at 35° C. or higher, preferably higher than 40° C. but not more than 95° C. The phenol at a temperature above its melting point, a diluted solution of the phenol, a solution of the nitrogen-containing compound in the phenol at a temperature higher than its melting point, or a diluted solution of these reactants, especially preferably the diluted solution of the phenol, is gradually added in the form of fine streams or liquid droplets, preferably the finest possible droplets, to the HCl-formaldehyde bath. By the foregoing procedure, the desired reaction can be advantageously carried out. Otherwise, the operation is much the same as in embodiment 1. If the temperature of the HCl-formaldehyde bath is high, the nitrogen-containing compound dissolved in the bath greatly tends to be polycondensed with the aldehyde in the bath. It is desirable therefore to add the phenol within a short period after the nitrogen-containing compound is dissolved in the bath.

Embodiment 4

The nitrogen-containing compound is dissolved in advance in the HCl-formaldehyde bath, and the bath is kept at a temperature of 40° C. or lower. The phenol at a temperature above its melting point, a solution of the nitrogen-containing compound in the phenol at a temperature higher than its melting point, a diluted solution of the phenol, or a diluted solution of these reactants, preferably the diluted solution of the phenol, is added to the bath. By this procedure, the desired reaction can be carried out advantageously. Otherwise, the operation is much the same as in Embodiment 2. As in embodiment 3, the nitrogen-containing compound dissolved in the bath tends to be polycondensed with the aldehyde in the bath. Hence, the phenol is added desirably within a short period of time after the dissolving of the nitrogen-containing compound in the bath.

Examples of the phenol used in this invention include phenol, meta-cresol, o-cresol, p-cresol, bisphenol A, o-, m- or p-($C_2$-$C_4$ alkyl)phenols, p-phenylphenol, xylenol, resorcinol and hydraquinone. Materials containing these phenols as main ingredients such as cashew nutshell liquid can equally be used as the phenol in this invention. Of these, phenol, m-cresol, and mixtures of phenol with the other phenols are preferred. These phenol mixture preferably contain at least 50% by weight, especially at least 65% by weight, of phenol.

Phenol, m-cresol, and a mixture of phenol and resorcinol are especially preferred in this invention since they have good reactivity with the nitrogen-containing compound or the aldehydes and therefore the efficiency of production of the resin of this invention is high.

The nitrogen containing compound used in this invention is a compound containing at least two active hydrogens in the molecule. Preferably, it contains in the molecule at least one group having active hydrogens selected from the class consisting of amino groups, amide groups, thioamide groups, ureylene groups and thioureylene groups. Examples of such nitrogen-containing compound are urea, thiourea, methylol derivatives of urea or thiourea, aniline melamine, guanidine, guanamine, dicyandiamide, fatty acid amides, polyamides, toluidine, cyanuric acid, and functional derivatives of these compounds. They may be used either singly or as a mixture of two or more.

Of these nitrogen-containing compounds, urea, thiourea, methylol derivatives of these (e.g., N,N-dimethylolurea, N,N'-dimethylolurea and N,N-dimethylolthiourea), aniline, melamine, guanidine, guanamine and dicyandiamide are preferred. These nitrogen-containing compounds have good reactivity with the phenol or the aldehyde, and also give a granular or powdery resin in the form of fine particles with a relatively uniform shape.

Urea is especially suitably used in this invention because it is easy to handle as a material and gives a white fine granular or powdery resin having excellent quality.

Suitable formaldehyde supply sources for the HCl-formaldehyde bath include formalin, trioxane, tetraoxane and para-formaldehyde.

The HCl-formaldehyde bath used in this invention may include up to 10% by weight of an aldehyde other than formaldehyde in addition to the aforesaid formaldehyde supply sources. Examples of suitable other aldehydes are monofunctional aliphatic aldehydes having 2 to 4 carbon atoms, glyoxal, furfural and benzaldehyde. Examples of the aliphatic aldehydes include acetaldehyde, propionaldehyde, n-butyl aldehyde and iso-butyl aldehyde. These aldehydes may be used singly or as a mixture of two or more.

The other aldehydes are frequently used to retard the rate of reaction and make it easy to control the reaction because the reaction in accordance with this invention involving the nitrogen-containing compound proceeds much more rapidly than in the absence of the nitrogen-containing compound.

The other aldehyde may also be included in the matrix forming the resin of this invention. Such a resin frequently has excellent affinity for rubber, or possesses higher oil resistance and electrical properties.

According to the most preferred embodiment of this invention, the aldehyde is substantially formaldehyde, the phenol is substantially phenol, and the nitrogen-containing compound is substantially urea.

In the process of this invention, the phenol and the nitrogen-containing compound are used in such amounts that the proportion of the nitrogen-containing compound is preferably 5 to 75% by weight, more preferably 15 to 65% by weight, especially preferably 25 to 55% by weight. When the nitrogen-containing compound is used in a proportion of 5 to 75% by weight, there can be obtained a granular or powdery resin having excellent heat resistance, thermal insulation, water resistance, alkali resistance, arc resistance and mechanical properties. If the proportion of the nitrogen-containing compound is less than 5% by weight, there is a tendency to the formation of a nitrogen-containing resin whose properties are improved only to a slight degree over a granular or powdery phenol-formaldehyde resin substantially free from nitrogen. If, on the other hand, the amount of the nitrogen-containing compound is larger than 80% by weight, the excess of the nitrogen-containing compound which has not been involved in the formation of the granular or powdery copolymer resin remains in the HCl-formaldehyde bath, or the formation of a lumpy product increases. Hence, proportions above 80% by weight would not be desirable.

The granular or powdery nitrogen-containing phenol-aldehyde copolymer resin solid obtained by the above procedure after completing the desired reaction may be worked up into a final desired product by separating it from the HCl-formaldehyde bath and washing it with water, and preferably neutralizing the adhering hydrochloric acid with an aqueous alkaline solution and washing the product.

Thus, the process of this invention has the advantage that the nitrogen-containing resin can be produced in a weight far exceeding the total weight of the phenol and the nitrogen-containing compound used.

Aqueous solutions of alkali metals, preferably aqueous solutions of alkali metals obtained by dissolving them in an aqueous solution of ammonia or a methanolic aqueous solution of ammonia, may be used as the aqueous alkaline solution. The suitable concentration of ammonia in such a solution is 0.1 to 5% by weight, especially 0.3 to 3% by weight. When the methanolic aqueous solution is to be used, the suitable concentration of methanol is 20 to 80% by weight, preferably 35 to 60% by weight. Advantageously, the neutralization with the aqueous alkaline solution is carried out at a temperature of 20° to 90° C., preferably 40° to 70° C.

The granular or powdery solid obtained after the above washing treatment with or without the subsequent neutralization and washing may be dehydrated and offered directly for end uses. Or it may be offered for end uses after drying it in a customary manner. Or before or after the drying, it may be pulverized lightly by any desired pulverizing machine.

[Granular or powdery resin]

According to this invention, there is provided a granular or powdery nitrogen-containing phenol-aldehyde copolymer resin which is a condensation product of a phenol, a nitrogen-containing compound having at least two active hydrogen atoms and an aldehyde, said granular or powdery resin being characterized by (A) containing spherical primary particles and secondary particles resulting from the agglomeration of the primary particles, each of said particles having a particle diameter of 0.1 to 100 microns, (B) having such a size that at least 50% by weight thereof can pass through a 150 Tyler mesh sieve, (C) having a free phenol content, determined by liquid chromatography, of not more than 50 ppm, and (D) having a $D_{960-1020}/D_{1450-1550}$ ratio of from 0.1 to 2.0 in its infrared absorption spectrum measured by a KBr tablet method, wherein $D_{960-1020}$ represents the highest absorption intensity of absorption peaks at 960 to 1020 cm$^{-1}$ assigned to the methylol groups, and $D_{1450-1500}$ represents the highest absorption intensity of absorption peaks at 1450 to 1500 cm$^{-1}$ assigned to the aromatic double bond, and preferbly further having a $D_{1280-1360}/D_{1450-1500}$ ratio of from 0.15 to 3.0 in its infrared absorption spectrum measured by a KBr method, wherein $D_{1280-1360}$ is the highest absorption intensity of absorption peaks at 1280 to 1360 cm$^{-1}$ assigned to the carbon nitrogen bond and $D_{1450-1500}$ is as defined above.

In the granular or powdery nitrogen-containing phenol-aldehyde copolymer resin of this invention (to be referred to sometimes as the product of the invention), the limitation (A) that the spherical primary particles and the secondary particles resulting from the agglomeration of the primary particles have a particle diameter of 0.1 to 100 microns, the limitation (B) that at least 50% by weight of the entire resin can pass through a 150 Tyler mesh sieve, the limitation (C) that the free phenol content is not more than 50 ppm, and the limitation (D) that the resin has a $D_{960-1020}/D_{1450-1500}$ ratio of 0.1 to 2.0, and preferably a $D_{1280-1360}/D_{1450-1500}$ ratio of 0.15 to 3.0 are all measured by the methods described hereinbelow.

A first feature of the product of the invention is that it consists mostly of spherical primary particles and secondary particles resulting from the agglomeration of the primary particles, each having a particle diameter of 0.1 to 100 microns, preferably 0.1 to 50 microns as specified in (A) above which is quite different from a forcibly pulverized product of a cured product of a known novolak or resol resin or a pulverization product of known cured novolak fibers. This fact is clearly demonstrated by the scanning electron microphotographs attached to this application as FIGS. 1A to 5A and 1B to 5B.

As shown in FIGS. 1 to 5, at least 30%, preferably at least 50%, of the granular or powdery resin product of this invention consists of spherical primary particles and secondary agglomerated particles having a particle diameter of 0.1 to 100 microns, preferably 0.1 to 50 microns. The expression 30% or 50% means that as defined in the description of the method for measuring the particle diameter given hereinbelow, it is 30% or 50% based on the number of entire particles (including the secondary agglomerated particles) of the resin in one visual field of an optical microscope having a magnification of 100 to 1,000 or a scanning electron microscope having a magnification of 500 to 5000. It is preferred that 70% to substantially 100% of the granular or powdery product of the invention consist of spherical primary particles and secondary agglomerated particles each having a particle diameter of 0.1 to 100 microns. Especially preferably, at least 30%, especially at least 50%, of the number (as an average of those in five visual fields) of particles in the visual field of a microphotograph in accordance with the above definition consists of spherical primary particles and secondary agglomerated particles having a particle diameter in the range of 0.1 to 50 microns, preferably 0.1 to 20 microns.

That the individual particles of the granular or powdery resin product of this invention are composed of spherical primary particles and secondary agglomerated particles each having a very small particle diameter as presumably because the process of this invention involves adding the phenol and the nitrogen-containing compound (or their diluted solution) to the HCl-formaldehyde bath to form a uniform solution at least partly, then forming very small white suspended particles in the solution, and developing the white suspended particles into stable granular or powdery particles which have undergone curing reaction to some extent.

Since the granular or powdery resin product of this invention is formed mainly of the minute spherical primary particles and the secondary agglomerated particles thereof, it is very small in size as specified in (B) above. Thus, at least 50% by weight, preferably at least 70% by weight, especially preferably at least 80% by weight, of the entire resin passes through a 150 Tyler mesh sieve. The expression "passing through the sieve" does not exclude the exertion of a force which does not cause forcible destruction of the particles (including the secondary agglomerated particles) in the procedure of screening the granular or powdery product through the sieve, for example light crumpling of the granular or powdery product by hand, light pushing or levelling of the particles on the mesh by means of a plectrum-like piece, or light tapping of the particles by hand because the particles of the granular or powder resin of this invention become agglomerated as their particle size becomes smaller.

As specified in (C) above, the granular or powdery product of the invention has a free phenol content, determined by liquid chromatography, of not more than 50 ppm, preferably not more than 40 ppm, above all not more than 20 ppm. That the product of the invention has a very low free phenol content is also presumably because the process of the invention comprises adding the phenol and the nitrogen-containing compound or their diluted solution to the HCl-formaldehyde bath to form a uniform solution at least partly, then forming very fine white suspended particles and developing them into stable fine particles, and therefore, substantially all of the phenol added, especially the phenol which participates in the formation of the product of the invention, reacts with aldehyde present in large excess. The granular or powdery products obtained by the methods disclosed in Japanese Patent Publication No. 42077/1978 cited above has a free phenol content of as high as 0.3 to about 6% by weight. In contrast, the granular or powdery product of the invention is quite small, and this fact is an important advantage of granular of powdery products of this kind and is very surprising.

Furthermore, as specified in (D), the granular or powdery resin product of this invention has a $D_{960-1020}/D_{1450-1500}$ ratio of from 0.1 to 2.0, and preferably further has a $D_{1280-1360}/D_{1450-1500}$ ratio of 0.15 to 3.0.

A preferred species of the product of this invention has a $D_{960-1020}/D_{1450-1500}$ ratio of 0.15 to 0.6 and preferably further has a $D_{1280-1360}/D_{1450-1500}$ ratio of 0.4 to 2.0.

An especially preferred species of the product of this invention has a $D_{960-1020}/D_{1450-1500}$ ratio of 0.2 to 0.4 and preferably further has a $D_{1280-1360}/D_{1450-1500}$ ratio of 0.7 to 1.5.

The product of this invention is further characterized by an infrared absorption spectrum determined by the KBr tablet method which has a $D_{1580-1650}/D_{1450-1500}$ ratio of 0.3 to 4.5, preferably 0.75 to 2.0, especially preferably 1.0 to 1.5, wherein $D_{1580-1650}$ is the highest absorption intensity of absorption peaks at 1580 to 1650 $cm^{-1}$.

Generally, it is difficult to determine the assignment of various functional groups of a substance having a three-dimensional crosslinked structure by an infrared absorption spectroscopic method because peaks in its infrared absorption spectral chart frequently shift greatly. But from the infrared absorption spectra of the phenol-aldehyde resin and various nitrogen-containing compounds, it has been determined that in the infrared absorption spectrum of the copolymer resin of this invention, the absorptions peaks at 960 to 1020 $cm^{-1}$ are assigned to the methylol groups, the absorption peaks at 1280 to 1360 $cm^{-1}$ are assigned to the carbon-nitrogen bond, and the absorptions peaks at 1450 to 1500 $cm^{-1}$ are assigned to the aromatic double bond.

The assignment of the absorptions at 1580 to 1650 $cm^{-1}$ is difficult. But since the $D_{1580-1650}/D_{1450-1500}$ using the highest absorption intensity of the peaks at 1580 to 1650 $cm^{-1}$ can clearly distinguish from the same ratio in a nitrogen-free phenol-formaldehyde resin, these absorptions can be recognized as characteristic absorptions for identifying the resin of this invention.

It is understood that the ratio of absorption intensities in the infrared absorption spectrum of the product of this invention, for example $D_{960-1020}/D_{1450-1500}$, which is one parameter for specifying the product of this invention, is a value associated with its structure and shows that the product of this invention contains a considerable amount of the methylol groups and the methylol group content can be adjusted within a certain range.

The granular or powdery resin product is characterized by having the characteristics (A) to (D) described hereinabove.

The granular or powdery resin product of this invention is very fine in size and has very good flowability because it contains spherical primary particles and secondary agglomerated particles each having a particle diameter of 0.1 to 100 microns, preferably 0.1 to 50 microns [the characteristic (A)] preferably in a proportion of at least 30%, and at least 50% by weight, preferably at least 70% by weight, of these particles can pass through a 150 Tyler mesh sieve (the characteristic (B)]. It can be mixed in a relatively large amount with another resin, and the resulting mixture, when used as an injection molding material, can be smoothly extruded without blocking up nozzles. Since the particulate products of the invention contain very minute spherical primary particles as a basic constituent element, cured molded articles prepared from such products as fillers show superior mechanical properties, particularly high resistance to compression. Furthermore, the granular or powdery resin product of this invention is very stable at ordinary temperature. Moreover, since it contains a considerable amount of methylol groups, it has reactivity in the heated state. It exhibits reactivity when it is molded and heat-cured either singly or together with another molding material such as resol resins, other resins and rubbers. Hence, it can be molded into articles having superior physical and mechanical properties, thermal insulation, heat resistance and electrical properties, especially heat resistance, as shown in the following Referential Examples.

A cured product of a conventional resol resin, cured novolak fibers, and a heat-infusible cured product obtained by mixing a novolak resin with about 10% by weight of hexamine and heat curing the mixture, which have previously been known, are susceptible to oxidative decomposition in an oxidizing atmosphere such as air. For example, when a powder of such a product is placed in the air at 200° C., it generates heat to such an extent that its inside is soon ignited spontaneously, and is finally decomposed. On the other hand, presumably because of the inclusion of nitrogen, the product of this invention has very high resistance to oxidation, and even when it is placed for an extended period of time in the same atmosphere as above, the temperature of the inside of the powdery product rarely exceeds the temperature of the atmosphere and its heat resistance is very high.

Since the granular or powdery resin of this invention has a free phenol content of not more than 50 ppm, preferably not more than 40 ppm, above all not more than 20 ppm [characteristic (C)], it is safe and very easy to handle. Accordingly, even when it is used as a binder, etc. in the formation of paper-like sheets of asbestos or synthetic resins or in the production of nonwoven fabrics, not only the resulting products but also the waste liquors contain only a very small amount of free phenol, and do not cause pollution. Furthermore, when it is molded in admixture with another resin, no side-reaction attributed to phenol takes place, and no deterioration in property due to free phenol occurs in the molded articles.

The granular or powdery resin of the invention as obtained may be one whose curing reaction has not fully proceeded, or one whose curing reaction has proceeded relatively sufficiently, according to the process of this invention. As a result, when pressed for 5 minutes at 100° C. in accordance with the method of measuring heat fusibility to be described hereinbelow, the granular or powdery resin of the invention is either (a) a lumpy or plate-like product as a result of partial fusion, or (b) a granular or powdery product without substantial melting or fusion.

It has been ascertained that many of the granular or powdery resins of this invention contain at least 1% by weight, preferably 2 to 30% by weight, of nitrogen.

The granular or powdery resin of this invention has a solubility in methanol, measured by the testing method to be described hereinbelow, of not more than 20% by weight, preferably not more than 15% by weight. In particular, the granular or powdery resin product (b) mentioned above has a solubility in methanol of usually not more than 5% by weight, and thus shows high resistance to dissolution in methanol. In contrast, the methanol solubility of the granular or powdery resin product (a) mentioned above is usually higher than that of the product (b).

The granular or powdery resin of this invention, as is clear from the process of this invention, has excellent heat resistance, and does not substantially contain hydrophilic polymeric compounds. Accordingly, when it is molded, and heat-cured either alone or in combination with another resin or a rubber, there is no likelihood of deteriorating the properties of the molded articles by such compounds.

As stated hereinabove, the granular or powdery nitrogen-containing phenol-aldehyde resin product of the invention is very fine, has good storage stability, excellent flow characteristics and a very low free phenol content, and contains some amounts of methylol groups and nitrogen. Therefore, it has the excellent advantage of having reactivity and giving a product having excellent heat resistance when molded and heated either singly or together with another resin or a rubber. The product (a) which at least partly shows fusibility when heated at 100° C. for 5 minutes in accordance with the heat fusibility test to be described is especially useful as a binder or a filler for the production of heat-resistant or thermally insulative molded articles. The product (b) which does not show fusibility by the above test is especially useful as a filler for the production of heat-resistant, thermally insulative or high impact molded articles and carbonized molded articles.

The following examples illustrate the present invention more specifically. The various date given in these examples were measured by the following methods.

1. Content of particles having a particle size of 0.1 to 100μ

A portion weighing about 0.1 g was sampled from five different sites of one sample.

A part of each of the 0.1 g portions so sampled was placed on a slide glass for microscopic examination. The sample on the slide glass was spread to minimize accumulation of particles for easy observation.

The microscopic observation was made with regard to that part of the sample in which about 10 to about 50 primary particles and/or the secondary agglomerated particles thereof were present in the visual field of an optical microscope usually having a magnification of 100 to 1000. The sizes of all particles existing in the visual field of the optical microscope were read by a measure set in the visual field of the optical microscope and recorded.

The content (%) of particles having a size of 0.1 to 100μ can be calculated in accordance with the following equation.

$$\text{Content (\%)} = \frac{N_1}{N_0} \times 100$$

$N_0$: the total number of particles whose sizes were read in the visual field under the microscope, and
$N_1$: the number of those particles in $N_0$ which had a size of 0.1 to 100μ.

For each sample, the average of values obtained from the five sampled portions was calculated.

2. Amount of particles which passed through a 150 Tyler mesh sieve

About 10 g of a dried sample, if desired after lightly crumpled by hand, was accurately weighed. Over the course of 5 minutes, the sample was put little by little in a 150 Tyler mesh sieve vibrator (the opening size of the sieve 200 mm in diameter; vibrating speed 200 rpm). After the end of addition, the sieve was vibrated further for 10 minutes. The amount of the particles which passed through the 150 Tyler mesh sieve was calculated from the following equation.

$$\text{Amount (\% by weight)} = \frac{\omega_0 - \omega_1}{\omega_0} \times 100$$

$\omega_0$: the amount of the sample put in the sieve (g),
$\omega_1$: the amount of the sample which remained on the 150 Tyler mesh sieve (g).

3. Free phenol content

About 10 g of the sample which passed through the 150 Tyler mesh sieve was precisely weighed, and heat-treated under reflux for 30 minutes in 190 g of 100% methanol. The heat-treated product was filtered through a No. 3 glass filter. The filtrate was subjected to high-performance liquid chromatography to determine the phenol content of the filtrate. The free phenol content of the sample was determined from a calibration curve separately prepared.

The operating conditions of high-performance liquid chromatography were as follows:
Device: Model 6000 A made by Waters Co., U.S.A.
Column carrier: μ-Bondapak $C_{18}$
Column: ¼ inch in diameter and 1 foot in length
Column temperature: room temperature
Eluent: methano/water (3/7 by volume)
Flow rate: 0.5 ml/min.
Detector: UV (254 nm), range 0.01 (1 mV)

The phenol content of the filtrate was determined from a separately prepared calibration curve (showing the relation between the phenol content and the height of a peak based on phenol).

4. Infrared absorption spectrum and absorption intensities

The infrared absorption spectrum of a sample prepared by a usual KBr tablet method was measured by means of an infrared spectrophotometer (Model 225 made by Hitachi Limited).

The absorption intensity at a specified wavelength was determined in the following way.

A base line is drawn tangent to a peak whose absorption intensity is to be determined in the measured infrared absorption spectral chart. Let the transmittance of the vertex of the peak be $t_p$ and the transmittance of the base line at the specified wavelength be $t_b$, then the absorption intensity D at the specified wavelength is given by the following equation.

$$D = \log \frac{t_b}{t_p}$$

Accordingly, the ratio of the absorption intensity of a peak at 960 to 1020 $cm^{-1}$ to that of a peak at 1450 to 1500 $cm^{-1}$ is given by the ratio of the respective absorption intensities determined by the above equation (i.e., $D_{960\text{-}1020}/D_{1450\text{-}1500}$).

5. Heat resistance test

Square receptacles made of a 300-mesh wire gauze with each side measuring 5 cm were each filled with 25 g of a sample, and left to stand for 8 hours in an air dryer at 200° C. The temperatures of the central portions of the samples were measured by a thermocouple thermometer, and the maximum temperature reached was determined and defined as heat resistance.

6. Light reflectance (reflection spectral method)

By using a two-wavelength spectrophotometer (Model 557 made by Hitachi Limited), the light reflectance (%) of a sample at a wavelength of 500 mμ was measured. The reflectance of a standard white plate was taken as 100%.

7. Heat fusibility at 100° C.

About 5 g of a sample which passed through a 100 Tyler mesh sieve was interposed between two 0.2 mm-thick stainless steel sheets, and the assembly was passed under an initial pressure of 50 kg for 5 minutes by means of a hot press kept at 100° C. (a single acting compression molding machine manufactured by Shinto Kinzoku Kogyosho Co., Ltd.). The press was released, and the hot-pressed sample was taken out from between the two stainless steel sheets, and observed. When the sample so taken out was in the form of a flat plate as a result of melting or fusion, it was judged that the sample had fusibility. When no appreciable difference was noted after the hot pressing, the sample was determined to have infusibility.

8. Alcohol resistance

About 10 g of a sample was precisely weighed (the precisely measured weight is given by $W_0$), and heat-treated under reflux for 30 minutes in about 500 ml of 100% methanol. The mixture was filtered on a No. 3 glass filter. The sample remaining on the filter was washed with about 100 ml of methanol. Then, the sample remaining on the filter was dried at 70° C. for 2 hours. The weight of the dried sample was precisely weighed (the precisely measured weight is given by $W_{11}$). The solubility of the sample in methanol was calculated from the following equation. The lower the solubility in methanol, the higher the alcohol resistance.

$$\text{Solubility in methanol (\%)} = \frac{W_0 - W_{11}}{W_0} \times 100$$

9. Bulk density

A sample which passed through a 150 Tyler mesh sieve was poured into a 100 ml measuring cylinder whose brim corresponded to a 100 ml indicator mark) from a height 2 cm above the brim of the measuring cylinder. The bulk density of the sample is defined by the following equation.

$$\text{Bulk density (g/ml)} = \frac{W(g)}{100 (ml)}$$

W: the weight in grams of the sample per 100 ml.

EXAMPLE 1

(1) A 2-liter separable flask was charged with 1,500 g of a mixed aqueous solution at 25° C. for hydrochloric acid and formaldehyde having each of the compositions shown in Table 1, and 125 g of a mixed aqueous solution (25° C.) containing 20% by weight of phenol, 20% by weight of urea and 14.6% by weight of formaldehyde prepared from 98% by weight phenol (the remaining 2% by weight being water), urea, 37% by weight formalin and water. The mixture was stirred for 15 seconds after the addition, and then left to stand for 60 minutes. During the 60-minute standing, the contents in the separable flask remained clear (Runs Nos. 1 and 20 in Table 1), or changed from a clear solution to a solution containing white suspended particles (Runs 3, 9 and 18 in Table 1), or changed from a clear solution to a white turbid solution containing white suspended particle (Runs Nos. 2, 4 to 8, 10 to 17 and 19 in Table 1). When the white suspended particles were microscopically observed, spherical particles, agglomerated masses of the spherical particles and a small amount of a powder were seen to exist.

With occasional stirring, the contents of the separable flask were heated to 80° C. over 60 minutes, and then maintained at a temperature of 80° to 82° C. for 15 minutes. The reaction product was washed with hot water at 40° to 45° C., treated at 60° C. for 30 minutes in a mixed aqueous solution containing 0.5% by weight of ammonia and 50% by weight of methanol, again washed with warm water at 40° to 45° C., and then dried at 80° C. for 2 hours.

The properties of the reaction products obtained in the above manner by using mixed aqueous solutions of hydrochloric acid and formaldehyde having the various compositions are shown in Table 2.

(2) For comparison, the following experiments were conducted (a) A 1-liter separable flask was charged with 282 g of distilled phenol, 369 g of 37% by weight formalin, and 150 g of a 26% by weight aqueous solution of ammonia, and with stirring, the mixture was heated from room temperature to 70° C. over 60 minutes. The mixture was further heated with stirring at 70° to 72° C. for 90 minutes, and then allowed to cool. The cooled mixture was dehydrated by azeotropic distillation under a pressure of 40 mmHg while adding 300 g of methanol in small portions. Methanol (700 g) was added as a solvent, and a yellowish clear solution of a resol resin was withdrawn.

When a part of the resol resin solution was subjected to solvent elimination under reduced pressure, it vigorously foamed and changed to a gel. The gel was heat-cured in a nitrogen gas at 160° C. for 60 minutes. The resulting cured foamed product was pulverized and screened by a 150 Tyler mesh sieve. A small amount of a powder which passed through the sieve was obtained. The heat-cured resol resin was very hard, and even by using various pulverizing machines, a ball mill, and a vibratory mill for fluorescent X-rays, a powder which passed through the 150 Tyler mesh sieve was extremely difficult to obtain. The resulting powder of the heat-cured resol resin was treated with a mixed aqueous solution containing 0.5% by weight of ammonia and 50% by weight of methanol under the same conditions as described above, washed with warm water, and then dried. The properties of the product are shown in Table 2 as Run No. 21.

(b) A 1-liter separable flask was charged with 390 g of phenol, 370 g of 37% by weight formalin, 1.5 g of oxalic acid and 390 g of water. With stirring, the mixture was heated to 90° C. over 60 minutes, and maintained at 90° to 92° C. for 60 minutes with stirring. Then, 1.0 g of 35% by weight hydrochloric acid was added, and the mixture was heated further at 90° to 92° C. for 60 minutes. The product was cooled by adding 500 g of water. Water was removed by a siphon, and the residue was heated under a pressure of 30 mmHg, maintained at 100° C. for 3 hours, and further at 180° C. under reduced pressure for 3 hours. On cooling, the resultant novolak resin was obtained as a yellowish brown solid which had a softening temperature of 78° to 80° C. and a free phenol content, determined by liquid chromatography, of 0.76% by weight.

The novolak resin was pulverized and mixed with 15% by weight of hexamethylenetetramine. The mixture was heat-cured at 160° C. for 120 minutes in a nitrogen gas, pulverized by a ball mill, and passed through a 150 Tyler mesh sieve. The resultant powder was treated with a mixed aqueous solution containing 0.5% by weight of ammonia and 50% by weight of methanol, washed with warm water and then dried under the same conditions as described above. The properties of the resulting product are shown in Table 2 as Run No. 22.

(c) The novolak resin obtained as above was melt-spun at 136° to 138° C. through a spinneret containing 120 orifices having a diameter of 0.25 mm. The spun filaments having an average size of 2.1 denier were dipped for 60 minutes at 20° to 21° C. in a mixed aqueous solution containing 18% by weight of hydrochloric acid and 18% by weight of formaldehyde, heated to 97° C. over 5 hours, and then maintained at 97° to 98° C. for 10 hours. The cured novolak fibers were washed with warm water treated with a mixed aqueous solution containing 0.5% by weight of ammonia and 50% by weight of methanol, washed with water, and then dried under the same conditions as described above. The treated fibers were pulverized by a ball mill, and passed through a 150 Tyler mesh sieve. The properties of the powder which passed through the 150 Tyler mesh sieve are shown in Table 2 as Run No. 23.

(3) Table 1 shows the concentrations of hydrochloric acid and formaldehyde, the total concentration of hydrochloric acid and formaldehyde, the proportion of the HCl-formaldehyde solution based on the total weight of phenol and urea, and the mole ratio of formaldehyde to phenol plus urea in each run.

Table 2 shows the contents of particles having a size of 0.1 to 50μ and 0.1 to 100μ resulting samples determined by microscopic observation, the amounts of the samples which passed through a 150 Tyler mesh sieve, and the ratio of the IR absorption intensity at 960-1020 cm$^{-1}$ to that at 1450-1500 cm$^{-1}$, the ratio of IR absorption intensity at 1280-1360 cm$^{-1}$ to that at 1450-1500 cm$^{-1}$ and the ratio of IR absorption intensity at 1580-1650 cm$^{-1}$ to that at 1450-1500 cm$^{-1}$.

the lumpy and plate-like masses. The parenthesized figures shown in Table 2 in regard to these data are based only upon the entire granular or powdery product in the total solids formed.

It is seen from the foregoing experimental facts in-

TABLE 1

| Run No. | Concentrations in the HCl—formaldehyde bath (wt. %) | | | Proportions of the HCl—HCHO bath based on the total weight of phenol and urea (wt. %) | | Mole ratio of total HCHO to the mixture of phenol and urea |
|---|---|---|---|---|---|---|
| | HCl | HCHO | Total | HCl | HCHO | |
| 1 | 3 | 1 | 4 | 90 | 30 | 1.6 |
| 2 | 3 | 28 | 31 | 90 | 840 | 21.2 |
| 3 | 5 | 2 | 7 | 150 | 60 | 2.3 |
| 4 | 5 | 10 | 15 | 150 | 310 | 8.1 |
| 5 | 5 | 22 | 27 | 150 | 660 | 16.8 |
| 6 | 7 | 30 | 37 | 210 | 900 | 22.6 |
| 7 | 10 | 7 | 17 | 300 | 210 | 5.9 |
| 8 | 10 | 18 | 28 | 300 | 540 | 13.9 |
| 9 | 12 | 3 | 15 | 360 | 90 | 3.0 |
| 10 | 15 | 5 | 20 | 450 | 150 | 4.5 |
| 11 | 15 | 22 | 37 | 450 | 660 | 16.8 |
| 12 | 18 | 10 | 28 | 540 | 300 | 8.1 |
| 13 | 20 | 7 | 27 | 600 | 210 | 5.9 |
| 14 | 22 | 4 | 26 | 660 | 120 | 3.8 |
| 15 | 22 | 17 | 39 | 660 | 510 | 13.2 |
| 16 | 25 | 6 | 31 | 750 | 180 | 5.2 |
| 17 | 25 | 25 | 50 | 750 | 750 | 19.0 |
| 18 | 28 | 3 | 31 | 780 | 90 | 2.6 |
| 19 | 28 | 7 | 35 | 780 | 210 | 5.9 |
| 20 | 33 | 1 | 35 | 990 | 30 | 1.6 |
| 21 | Heat-cured product of resol resin | | | | | |
| 22 | Heat-cured product of novolak resin and hexamine | | | | | |
| 23 | Cured novolak fibers | | | | | |

TABLE 2

| Run No. | Content of 0.1-50μ particles (%) | Content of 0.1-100μ particles (%) | Content of 150-mesh pass particles (wt. %) | IR intensity ratio | | |
|---|---|---|---|---|---|---|
| | | | | 1580~1650 cm$^{-1}$ | 1280~1360 cm$^{-1}$ | 960~1020 cm$^{-1}$ |
| 1 | 13(86) | 13(100) | 13(87) | 0.31 | 0.29 | 0.10 |
| 2 | 6(45) | 6(58) | 6(52) | 0.46 | 0.53 | 0.53 |
| 3 | 32(91) | 32(98) | 32(93) | 0.73 | 0.46 | 0.14 |
| 4 | 56 | 78 | 65 | 1.67 | 0.73 | 0.45 |
| 5 | 38 | 47 | 58 | 1.41 | 0.86 | 0.47 |
| 6 | 7(18) | 7(39) | 7(66) | 1.36 | 0.75 | 0.48 |
| 7 | 99 | 99 | 93 | 1.34 | 0.88 | 0.31 |
| 8 | 90 | 99 | 88 | 1.26 | 0.97 | 0.38 |
| 9 | 78 | 85 | 72 | 1.18 | 0.65 | 0.29 |
| 10 | 92 | 100 | 87 | 1.29 | 0.96 | 0.23 |
| 11 | 43 | 87 | 68 | 1.16 | 0.85 | 0.37 |
| 12 | 100 | 100 | 100 | 1.37 | 1.10 | 0.29 |
| 13 | 100 | 100 | 100 | 1.26 | 1.08 | 0.26 |
| 14 | 72 | 77 | 66 | 1.38 | 0.54 | 0.19 |
| 15 | 50 | 76 | 76 | 1.54 | 0.97 | 0.56 |
| 16 | 84 | 96 | 81 | 1.49 | 0.66 | 0.31 |
| 17 | 10(63) | 10(68) | 10(73) | 1.01 | 0.78 | 0.64 |
| 18 | 38 | 69 | 65 | 1.34 | 0.47 | 0.19 |
| 19 | 46 | 75 | 69 | 1.14 | 0.77 | 0.32 |
| 20 | 7(18) | 7(49) | 7(54) | 0.75 | 0.39 | 0.12 |
| 21 | 17 | — | — | 0.22 | 0.10 | 0.03 |
| 22 | 58 | — | — | 0.50 | 0.13 | 3.73 |
| 23 | 39 | — | — | 0.15 | 0.08 | 0.14 |

In Runs Nos. 1, 2, 6, 17 and 20, a sticky resin, or a hard and large lumpy mass or plate-like mass formed in large amounts at the bottom of the separable flask.

In Runs Nos. 1, 2 and 20, less than 49 g of the solid product was obtained from 25 g of phenol and 25 g of urea.

In Runs 1, 2, 3, 6, 17 and 20, the data given in Table 2 of the contents (%) of particles having a size of 0.1 to 50μ and 0.1 to 100μ and the amounts of the samples which passed through a 150 Tyler mesh sieve were obtained with regard to the granular or powdery product based on the total solids including the sticky resin or cluding the results given in Table 2 that the methods used in Runs Nos. 1, 2, 3, 6, 17 and 20 are not recommendable. Nevertheless, the granular or powdery product present in the entire product obtained by each of these methods had the characteristics within the scope of the present invention.

(4) FIG. 1-A of the accompanying drawings shows a microphotograph, taken through a scanning electron microscope (magnification 1000), of the granular or powdery product obtained in Run No. 15.

FIG. 1-B shows a microphotograph, taken through a scanning electron microscope (magnification 3,000), of the granular or powdery product obtained in Run No. 7.

FIG. 6 shows an infrared absorption spectrum of the granular or powdery product obtained in Run No. 12. FIG. 6 also illustrates a method of determining $t_p$ and $t_b$ required for calculating the absorption intensity D in the infrared spectral chart. A base line is drawn tangent to a certain peak, and $t_p$ and $t_b$ at the wavelength of the peak can be determined as illustrated.

EXAMPLE 2

Mixed aqueous solutions containing 18% by weight of hydrochloric acid and 11% by weight of formaldehyde were put respectively in six 20-liter reaction vessels in an amount of 10.2 to 11.7 kg so that the bath ratios shown in Table 3 were obtained.

A mixed solution containing 30% by weight of phenol, 20% by weight of urea and 11% by weight of formaldehyde was added, with stirring at 23° C., to the reactors in an amount of 3.34 kg, 2.66 kg, 1.60 kg, 1.06 kg, 0.74 kg, and 0.45 kg, respectively. The bath ratio at this time was 7.0, 8.5, 13.5, 20.0, 28.0 and 45.0, respectively. In all cases, continued stirring after the addition of the mixed aqueous solution resulted in abrupt white turbidity in 10 to 60 seconds. As soon as white suspended particles were formed, the stirring was stopped and the reactor was left to stand. The temperature of the inside of the reactor gradually rose, and in 30 minutes after the formation of the white suspended particles, the formation of a white slurry-like or resinous product was observed in all of the reactors. With stirring, the contents in each of the reactors were heated to 75° C. over 2 hours, and then heated with stirring at 75° to 76° C. for 30 minutes. In the reactor in which the bath ratio was initially 7.0, a large amount of a resinous cured product adhered to the stirring rod and made the stirring very difficult.

The contents were then washed with water, treated at 50° C. for 30 minutes in a mixed aqueous solution containing 0.1% by weight of ammonia and 55% by weight of methanol, and further washed with hot water at 80° C. for 60 minutes. The resulting white granular or powdery product or the resulting lumpy product was lightly crumpled with hand, and dried at 100° C. for 2 hours. After drying, all of the products had a water content of less than 0.2% by weight.

Table 3 shows the maximum temperature reached within the reaction system from the initiation of the reaction to 30 minutes after the formation of white suspended particles, the yield of the reaction product, the presence or absence of spherical primary particles by microscopic observation, the content of particles which passed through a 150 Tyler mesh sieve in the reaction product, the heat fusibility of the reaction product at 100° C., the light reflectance (%) of the reaction product at 500 mμ in each run.

TABLE 3

| Run No. | Bath ratio | Maximum temperature attained in the reaction system (°C.) | Yield (wt. %) | Content of 150-mesh pass particles (wt. %) | Bulk density of 150-mesh pass particles (g/cc) | Amount of spherical primary particles | Heat fusibility at 100° C. | Light reflectance at 500 mμ (%) |
|---|---|---|---|---|---|---|---|---|
| 31 | 7.0 | 40.0 | 104 | 21 | 0.21 | Small | Fused | 72 |
| 32 | 8.5 | 39.0 | 121 | 68 | 0.17 | Large | Not fused | 81 |
| 33 | 13.5 | 38.0 | 129 | 87 | 0.16 | Constituting most of the particles | " | 82 |
| 34 | 20.0 | 36.5 | 134 | 98 | 0.14 | Constituting most of the particles | " | 87 |
| 35 | 28.0 | 36.0 | 135 | 100 | 0.12 | Constituting most of the particles | " | 88 |
| 36 | 45.0 | 35.5 | 130 | 99 | 0.12 | Constituting most of the particles | " | 88 |
| 21 | (Comparison; see Table 1) | — | — | 0.62 | None | " | 47 |
| 22 | (Comparison; see Table 1) | — | — | 0.46 | " | Fused | 58 |
| 23 | (Comparison; see Table 1) | — | — | 0.24 | " | Not fused | 54 |

In Run No. 31, about 70% of the solid product formed at the bottom of the reactor consisted of a plate-like product and a lumpy product, and only about 20% of the entire solid was a granular or powdery product. About 95% of the entire granular or powdery product passed through a 150 Tyler mesh sieve.

The amount of spherical primary particles in Run 31 is indicated as "small" in Table 3. This is because the proportion of the granular or powdery solid product in the entire solid was as low as about 20%. Hence, the method of Run No. 31 is not recommendable, but the resulting granular or solid product is within the scope of the granular or powdery resin of the invention.

The granular or powdery products formed in Runs Nos. 31 to 36 were composed almost entirely of particles having a particle diameter of 0.1 to 100μ.

FIGS. 2-A and 2-B respectively show scanning electron microphotographs of the product formed in Run No. 35 taken at a magnification of 1000 and 3000.

EXAMPLE 3

A 2-liter separable flask was charged with 1250 g of a mixed aqueous solution at 24° C. containing 20% by weight of hydrochloric acid and 8% by weight of formaldehyde. With stirring, a solution of a phenol and a nitrogen-containing compound diluted with 37% by weight formalin to a concentration of 20 to 80% by weight was added so that the total amount of the phenol and the nitrogen-containing compound became 50 g. As soon as the solution was added, the entire mixture became whitely turbid, and instantly turned white, pink or brown. In 10 seconds after the addition of the solution, the stirring was stopped. After stopping the stirring, the mixture was allowed to stand for 60 minutes. Again, with stirring, the temperature of the mixture was raised to 75° C. over 30 minutes. Then, the mixture was maintained at 73° to 76° C. for 60 minutes. The reaction mixture was washed with water, and then treated in a mixed aqueous solution containing 0.3% by weight of ammonia and 60% by weight of methanol at 45° C. for 60 minutes. The treated product was washed with water, and dried at 80° C. for 3 hours.

Table 4 summarizes the types and proportions of the phenol and the nitrogen-containing compound used, the concentrations of the phenol and the nitrogen-containing compound in the formalin-diluted solution, the color of the reaction product determined 60 minutes after the addition of the diluted solution, the yield of the reaction product based on the total amount of the phenol and the nitrogen-containing compound used, the content of particles having a size of 0.1 to 50μ in the reaction product, the proportion of 150-mesh pass particles in the reaction product, and the infrared spectral intensity ratios in each run.

FIGS. 3A and 3B show scanning electron microphotographs (magnification 1000 and 3000) of the product obtained in Run No. 40.

FIGS. 4A and 4B show scanning electron microphotographs (magnification 1000 and 3000) of the product obtained in Run No. 47.

FIGS. 5A and 5B show scanning electron microphotographs (magnification 1000 and 3000) of the product obtained in Run No. 50.

EXAMPLE 4

One thousand grams of mixed aqueous solutions containing 18% by weight of hydrochloric acid and 8% by weight of formaldehyde and heated respectively to 30°, 60°, 80° and 98° C. were prepared respectively in four 2-liter separable flasks. Then, 100 g of a mixed aqueous solution containing 20% by weight of phenol, 15% by weight of urea and 24% by weight of formaldehyde was added dropwise to each of the HCl-formaldehyde aqueous solutions over 30 seconds through a dropping funnel fitted to each separable flask. When the temperature of the HCl-formaldehyde solution was 60°, 80° and 98° C. respectively, white suspended particles formed as soon as the phenol-formaldehyde solution was added dropwise, and a white slurry-like product was formed. In particular, when the temperature of the HCl-formaldehyde bath was 98° C., the reaction proceeded within a very short period of time and a large amount of a secondary, relatively strongly agglomerated mass of granules or a powder was seen to form.

In the case of using the HCl-formaldehyde bath heated at 30° C., the mixture after the addition of the mixed aqueous solution was left to stand for 0.5 hour (Run No. 53), 1 hour (Run No. 54), 3 hours (Run No. 55), 6 hours (Run No. 56), 24 hours (Run No. 57), and 72 hours (Run No. 58).

Furthermore, in the case of using the aqueous solutions of HCl and formaldehyde at a temperature of 60°, 80° and 98° C., the mixture after the addition of the mixed aqueous solution of phenol, urea and formaldehyde was left to stand for 15 minutes (Runs Nos. 59, 60, and 61 respectively).

The product obtained in Run No. 54, while the mixed aqueous solution of HCl and formaldehyde was still adhering to it, was put in an HCl-formaldehyde aqueous solution having the same composition as above and

TABLE 4

| Run No. | Proportions of the materials (wt. %) Phenol | Proportions of the materials (wt. %) Nitrogen-containing compound | Concentration of the materials in the diluted solution (wt. %) | Color of the reaction product (60 minutes after addition) | Yield (wt. %) | Content of 0.1–50μ particles (%) | Content of 150 mesh pass particles (wt. %) | IR intensity ratios 1580~1650 cm$^{-1}$ | IR intensity ratios 1280~1350 cm$^{-1}$ | IR intensity ratios 960~1020 cm$^{-1}$ | Heat resistance test (°C.) |
|---|---|---|---|---|---|---|---|---|---|---|---|
| 37 | Phenol 100 | Urea 0 | 80 | Pink | 118 | 91 | 98 | 0.25 | 0.18 | 0.44 | 750 |
| 38 | Phenol 97 | Urea 3 | " | " | 108 | 90 | 98 | 0.27 | 0.18 | 0.31 | 420 |
| 39 | Phenol 94 | Urea 6 | " | " | 112 | 97 | 100 | 0.57 | 0.21 | 0.30 | 280 |
| 40 | Phenol 75 | Urea 25 | 50 | Pale pink | 128 | 100 | 100 | 1.24 | 0.95 | 0.19 | 200 |
| 41 | Phenol 55 | Urea 45 | 40 | White | 132 | 100 | 100 | 1.32 | 1.10 | 0.29 | " |
| 42 | Phenol 35 | Urea 64 | 30 | " | 115 | 100 | 100 | 1.37 | 1.08 | 0.29 | " |
| 43 | Phenol 25 | Urea 75 | 20 | " | 76 | 100 | 100 | 1.37 | 0.99 | 0.30 | " |
| 44 | Phenol 10 | Urea 90 | 20 | " | 31 | 100 | 100 | 1.24 | 0.96 | 0.27 | " |
| 45 | Phenol 50 | N,N—dimethylolurea 50 | " | " | 105 | 94 | 100 | 1.19 | 0.88 | 0.38 | " |
| 46 | Phenol 75 | Aniline 25 | 80 | Reddish brown | 111 | 82 | 88 | 1.21 | 1.03 | 0.26 | " |
| 47 | Phenol 50 | Melamine 50 | " | White | 86 | 100 | 96 | 1.15 | 0.75 | 0.28 | " |
| 48 | m-Cresol 50 | Urea 50 | 40 | " | 109 | 100 | 100 | 1.31 | 1.02 | 0.27 | " |
| 49 | Resorcinol 50 | Urea 50 | " | Red | 100 | 72 | 83 | 1.33 | 0.99 | 0.26 | " |
| 50 | Phenol/resorcinol =34/33 | Urea 33 | " | " | 132 | 91 | 94 | 1.25 | 0.99 | 0.25 | " |
| 51 | Phenol/t-butyl-phenol (=40/20) | Urea 40 | " | Brown | 84 | 96 | 96 | 1.16 | 0.96 | 0.19 | " |
| 52 | Phenol 50 | Urea/melamine (=25/25) | 50 | White | 102 | 95 | 100 | 1.24 | 1.01 | 0.30 | " |
| 21 | Heat-cure product of resol resin | | | | — | 17 | — | 0.22 | 0.10 | 0.03 | 720 |
| 22 | Heat-cured product of novolak resin and hexamine | | | | — | 58 | — | 0.50 | 0.13 | 3.73 | 610 |
| 23 | Cured novolak fibers | | | | — | 39 | — | 0.15 | 0.08 | 0.14 | 740 | heated at 60°, 80° and 98° C. respectively and left to stand for 15 minutes at the respective temperature (Runs Nos. 62, 63 and 64, respectively).

With stirring, the product obtained in Run No. 54 was put into each of a mixed aqueous solution at 80° C. containing 15% by weight of hydrochloric acid and 10% by weight of formaldehyde, a mixed aqueous solution at 80° C. containing 10% by weight of hydrochloric acid and 5% by weight of formaldehyde, and a mixed aqueous solution at 80° C. containing 5% by weight of hydrochloric acid and 5% by weight of formaldehyde, and maintained at 80° C. for 15 minutes with stirring (Runs Nos. 65, 66 and 67, respectively, in this order).

In all of Runs Nos. 65, 66 and 67, water was added to the reaction mixture after the above-mentioned reaction, and the cooled contents were withdrawn, washed with water, subjected to a neutralization treatment, washed with water, and then dried at 70° C. for 3 hours. The neutralization treatment was carried out in a 1.0% by weight aqueous solution of ammonia at 50° C. for 60 minutes.

Table 5 shows the proportion of particles which passed through a 150 Tyler mesh sieve, the heat fusibility at 100° C., $D_{960-1020}/D_{1450-1500}$, $D_{1280-1360}/D_{1450-1500}$ and $D_{1580-1650}/D_{1450-1500}$ and the free phenol content in each run.

TABLE 5

| Run No. | Proportion of 150-mesh pass particles (wt. %) | Heat fusibility at 100° C. | IR intensity ratios | | | Free phenol content (ppm) |
|---|---|---|---|---|---|---|
| | | | 1580–1650 cm$^{-1}$ | 1280–1350 cm$^{-1}$ | 960–1020 cm$^{-1}$ | |
| 53 | 58 | Fused | 0.24 | 0.14 | 0.19 | 21 |
| 54 | 91 | " | 0.28 | 0.18 | 0.25 | 15 |
| 55 | 98 | " | 0.57 | 0.46 | 0.28 | 9 |
| 56 | 100 | " | 0.81 | 0.63 | 0.27 | 4 |
| 57 | 100 | " | 0.90 | 0.74 | 0.27 | less than 2 |
| 58 | 100 | " | 1.01 | 0.96 | 0.28 | " |
| 59 | 74 | " | 1.21 | 1.11 | 0.27 | " |
| 60 | 86 | Not fused | 1.28 | 1.11 | 0.31 | " |
| 61 | 32 | " | 1.23 | 1.13 | 0.24 | " |
| 62 | 100 | Fused | 1.05 | 1.09 | 0.25 | " |
| 63 | 100 | Not fused | 1.27 | 1.19 | 0.37 | " |
| 64 | 73 | " | 1.27 | 1.18 | 0.31 | " |
| 65 | 100 | " | 1.37 | 1.09 | 0.28 | " |
| 66 | 100 | " | 1.31 | 1.11 | 0.26 | " |
| 67 | 98 | " | 1.26 | 1.13 | 0.26 | " |

EXAMPLE 5

Each of twelve 1-liter separable flasks was charged with 750 g of a mixed aqueous solution at 22° C. containing 18% by weight of hydrochloric acid and 11% by weight of formaldehyde. In each run, 20 g of phenol and 10 g of urea were used. In Run No. 68, phenol was dissolved in the HCl-formaldehyde aqueous solution in advance, and in Runs Nos. 69 and 70, only the urea was dissolved in advance in the HCl-formaldehyde mixed aqueous solution. In Run No. 68, the solution became whitely turbid in 45 seconds after the addition of the phenol. In Runs Nos. 68, 69 and 70, while the mixed aqueous solution in the separable flask was stirred, urea or phenol was added 90 seconds after the dissolving of the phenol or urea.

In Runs Nos. 71 to 79, 20 g of phenol and 10 g of urea were diluted with water or 10–44% by weight formalin, and the diluted solution was added all at once with stirring to the mixed aqueous solution of HCl and formaldehyde. In each of Runs Nos. 68 to 79, the diluted solution of the materials was added to the stirred mixed aqueous solution of HCl and formaldehyde. As soon as white suspended particles formed, the stirring was stopped and the suspension was allowed to stand for 2 hours. Then, again with stirring, the temperature of the suspension was raised to 80° C. over 60 minutes, and it was further maintained at 80° to 83° C. for 60 minutes. The contents were withdrawn, washed with water, and treated at 50° C. for 60 minutes in a mixed aqueous solution containing 0.3% by weight of ammonia and 35% by weight of methanol. The treated product was again washed with water and dried at 100° C. for 60 minutes.

Table 6 summarizes the concentration of the added phenol or urea or the added mixture of phenol and urea, the temperature of the diluted solution, the type of the solution used for dilution, the time which elapsed from the addition of the diluted solution until white suspended particles formed, the proportion of 150-mesh pass particles in the product and the solubility of the product in methanol in each run.

TABLE 6

| | Diluted solution | | Type of the solution for dilution | Time elasped until white suspended particles formed (sec.) | Proportion of 150-mesh pass particles (wt. %) | Solubility in methanol (wt. %) |
|---|---|---|---|---|---|---|
| Run No. | Concentration (wt. %) | Temperature (°C.) | | | | |
| 68 | 50 | 22 | 37% formalin | — | 21 | 5.2 |
| 69 | 100 | 40 | None | 17 | 83 | 1.4 |
| 70 | 75 | 22 | 37% formalin | 48 | 95 | 1.0 |
| 71 | 75 | 40 | " | 46 | 74 | 0 |
| 72 | 75 | 22 | " | 7 | 88 | 0.6 |
| 73 | 50 | " | " | 43 | 100 | 0 |
| 74 | 30 | " | " | 86 | 100 | 0 |
| 75 | 10 | " | " | 255 | 84 | 0.4 |
| 76 | 50 | " | Water | 67 | 82 | 1.8 |
| 77 | " | " | 10% formalin | 54 | 92 | 0.3 |
| 78 | " | " | 30% formalin | 43 | 100 | 0 |
| 79 | " | " | 44% formalin | 36 | 96 | 0.2 |

EXAMPLE 6

Each of two 1-liter separable flasks was charged with 750 g of a mixed aqueous solution at 20° C. containing 15% by weight of hydrochloric acid, 5% by weight of zinc chloride, 5% by weight of formaldehyde and 5% by weight of acetaldehyde, and while stirring the aqueous solution, a diluted solution at 18° C. prepared by dissolving 10 g of phenol, 10 g of resorcinol and 10 g of urea in 60 g of 37% formalin was added to each of the flasks at a time. In 28 to 30 seconds after the addition of the diluted solution, white suspended particles formed. One flask was stirred continuously, and the temperature elevation was started 60 minutes after the formation of the white suspended particles. The temperature was raied to 85° C. over the course of 90 minutes and the solution was maintained at this temperature for 15 minutes (Run No. 80). The stirring of the other separable flask was stopped after the formation of the white suspended particles, and the solution was allowed to stand for 60 minutes. Then, the solution was again stirred, and its temperature was raised to 85° C. over the course of 90 minutes. The solution was maintained at this temperature for 15 minutes (Run No. 81).

The products obtained in the two flasks were each treated at 40° C. for 60 minutes in a 0.5% by weight aqueous solution of sodium hydroxide, washed for 15 minutes at 40° C. in a 50% by weight aqueous solution of methanol, then washed with water, and dried at 105° C. for 60 minutes.

Table 7 summarizes the amounts of the products yielded, the content of particles having a particle diameter of 0.1 to 50μ and the proportion of particles which passed through a 150 Tyler mesh sieve.

TABLE 7

| Run No. | Amount of the product yielded (g) | Content of 0.1–50μ particles (%) | Proportion of 150-mesh pass particles (wt. %) |
| --- | --- | --- | --- |
| 80 | 35.4 | 83.6 | 72.5 |
| 81 | 36.9 | 100 | 100 |

REFERENTIAL EXAMPLE 1

Thirty grams of the product (as a filler) obtained in Run No. 35 in Example 2 was mixed with 30 g (as solids) of the resol resin (uncured) used in Run No. 21 of Example 1. The resin mixture was dried at room temperature for a day and night, and then dried in an oven at 80° C. for 30 minutes. A predetermined amount of the dried product was treated under a pressure of 50 kg/cm$^2$ for 30 minutes in a mold heated at 150° C. to form five test samples having a thickness of 3.5 mm and being in the form of a square each side measuring 10 mm.

As controls, five samples were prepared from the products obtained in Runs Nos. 21, 22 and 23 in Example 1 (as fillers) and the resol resin (uncured) used in Run No. 21 of Example 1 under the same conditions and by the same method as above.

In each run, the moldability of the resin composition and the compression strength, compression set and stickiness (compression strength multiplied by compression set) of the molded product (as an average of the five samples) by a compression tester were determined, and the results are shown in Table 8. The size of each test sample was precisely measured before the compression test by using a caliper gage.

TABLE 8

| Run No. | Filler | Moldability (flow of the resin composition) | Compression strength (kg/cm$^2$) | Compression set (%) | Stickiness (kg/cm$^2$ × %) |
| --- | --- | --- | --- | --- | --- |
| 80 | Products of Run No. 35 | Very good | 3180 | 35.4 | 11.3 × 10$^4$ |
| 81 | Product of Run No. 21 | Poor | 2370 | 17.6 | 4.2 × 10$^4$ |
| 82 | Product of Run No. 22 | Good (much gas generation) | 1280 | 36.4 | 4.7 × 10$^4$ |
| 83 | Product of Run No. 23 | Good | 2390 | 26.3 | 6.3 × 10$^4$ |

When the same uncured resol resin as described above was used alone in an attempt to form a molded article as above, the resin flowed out from the mold or was foamed when heated at 150° C., and a molded article could not be obtained.

REFERENTIAL EXAMPLE 2

Two hundred grams of a nitrile rubber compound composed of 100 parts by weight of nitrile rubber (Hycar OR25, a product of Japanese Zeon Co., Ltd.), 5 parts by weight of zinc oxide, 1.5 parts by weight of stearic acid, 1.25 parts by weight of Altax (a tradename for a product containing benzothiazyl disulfide as a main component), 3 parts by weight of pine tar, 3 parts by weight of Paraflux (tradename), 2 parts by weight of sulfur and 40 parts by weight of carbon black was blended with 300 g of trichloroethylene (Run No. 84). Separately, 150 g of the above nitrile rubber compound and 50 g of the product obtained in Run No. 34 were blended with 300 g of trichloroethylene (Run No. 85).

These product were each air dried for a day and a night, and then dried at 50° C. for 6 minutes. A predetermined amount of the dried products was treated in a mold heated at 140° C. under a pressure of 150 kg/cm$^2$ for 30 minutes, and also under a pressure of 1 to 2 kg/cm$^2$ for 30 minutes to give sheets having a thickness of 1.0 mm (Run No. 84) and 1.2 mm (Run No. 85), respectively, and being in the form of a square each side of which measured 10 cm.

Table 9 summarizes the moldability, thickness, hardness, tensile strength and elongation of the two sheets obtained as above, and also their tensile strength, retention, permanent compression set and insulation resistance measured after they were treated in the air at 150° C. for 24 hours.

TABLE 9

|  | Run No. 84 (control) | Run No. 85 |
| --- | --- | --- |
| Moldability | Flowability poor (gas blisters occurred) | Flowability good |
| Thickness (mm) | 1.0 | 1.2 |
| Hardness (degrees) | 72 | 83 |
| Tensile strength (kg/cm$^2$) | 168 | 177 |
| Tensile elongation (%) | 460 | 180 |
| Retention (%) of the strength after treatment at 150° C. for 24 hours | 92 | 125 |
| Permanent compression set (%) | 5.2 | 1.8 |
| Insulation resistance (ohms-cm) | 6 × 10$^8$ | 2 × 10$^{11}$ |

The hardness, strength and elongation were measured in accordance with the method of JIS-K-6301; the permanent compression set, by the method of ASTM- D39040-T; and the insulation resistance, by the method of ASTM-D257.

REFERENTIAL EXAMPLE 3

Fifty parts by weight of asbestos and 50 parts by weight of the product of Run No. 56 of Example 4 were dispersed in water with stirring. The resulting slurry having a solids concentration of 0.30% by weight was subjected to a sheet-forming process by means of a P.S.S. type sheet machine (manufactured by Toyo Seiki Co., Ltd.) and then hot-pressed at a temperature of 140° C. under a pressure of 5 kg/cm² for 3 minutes to product a sheet having a basis weight of 127 g/m² and a thickness of 0.3 mm. The yield of the resulting sheet calculated from the amounts of the raw materials used and the sheet was 99%.

The spent liquor after the sheet formation was filtered by a glass filter. The phenol content of the spent liquor, measured by the 4-aminoantipyrine method, was less than 0.01 ppm.

Table 10 summarizes the tensile strength of the sheet, its combustibility determined by application of a match flame, and its tensile strength measured after the sheet was treated in the air at 200° C. for 24 hours.

TABLE 10

| Run No. | Tensile strength of the sheet (kg/15 mm) | Combustibility | Tensile strength of the sheet after heat-treatment at 200° C. for 24 hrs. (kg/15 mm) |
|---|---|---|---|
| 86 | 3.9 | No burning | 4.6 |

REFERENTIAL EXAMPLE 4

Eighty parts by weight of 12-nylon for molding (intrinsic viscosity 0.99; melting point 177° C.) and 20 parts by weight of the product obtained in Run No. 41 of Example 3 were mixed in the molten state at 250° C. The molten mixture was poured into a mold kept at 150° C. and maintained at a pressure of 1 to 2 kg/cm² for 15 minutes to give a molded product having a size of 2×5×12 mm (Run No. 87).

Similarly, 12-nylon along was molded under the same in the same way as in above (Run No. 88).

Table 11 shows the water absorptions (measured in accordance with ASTM-D570-59T) of the articles, their states observed after they were maintained for 5 minutes on a hot plate at 200° C., and changes in their shape observed when a match flame was applied to the articles for 5 seconds.

TABLE 11

| Run No. | Water absorption | After maintenance at 200° C. | Match flame test |
|---|---|---|---|
| 87 | 0.6 | No change | Carbonized but the shape remained unchanged |
| 88 (control) | 1.5 | Melted | Melted and burnt |

What we claim is:

1. A granular or powdery nitrogen-containing phenolaldehyde copolymer resin which is a condensation product of a phenol, a nitrogen-containing compound having at least two active hydrogen atoms and an aldehyde, said granular or powdery resin being characterized by
    (A) containing spherical primary particles and secondary particles resulting from the agglomeration of the primary particles, each of said particles having a particle diameter of 0.1 to 100 microns,
    (B) having such a size that at least 50% by weight thereof can pass through a 150 Tyler mesh sieve,
    (C) having a free phenol content, determined by liquid chromatography, of not more than 50 ppm, and
    (D) having a $D_{960-1020}/D_{1450-1500}$ ratio of from 0.1 to 2.0 in its infrared absorption spectrum measured by a KBr tablet method, wherein $D_{960-1020}$ represents the highest absorption intensity of absorption peaks at 960 to 1020 cm$^{-1}$ assigned to the methylol groups, and $D_{1450-1500}$ represents the highest absorption intensity of absorption peaks at 1450 to 1500 cm$^{-1}$ assigned to the aromatic double bond.

2. The resin of claim 1 which further has a $D_{1280-1360}/D_{1450-1500}$ ratio of 0.15 to 3.0 in its infrared absorption spectrum. measured by the KBr tablet method, wherein $D_{1280-1360}$ represents the highest intensity of absorption peaks at 1280 to 1360 cm$^{-1}$ assigned to the carbon-nitrogen bond.

3. The resin of claim 1 or 2 wherein the phenol is phenol, m-cresol, or a mixture of phenol with another phenol.

4. The resin of claim 3 wherein the phenol is a mixture of phenol with o-cresol, m-cresol, p-cresol, bisphenol A, an o-, m- or p-(C₂-C₄ alkyl)phenol, p-phenylphenol, xylenol, hydroquinone or resorcinol.

5. The resin of claim 1 or 2 wherein the nitrogen-containing compound has at least one group having active hydrogen atoms selected from the class consisting of amino groups, amide groups, thioamido groups, ureylene groups and thioureylene groups.

6. The resin of claim 5 wherein the nitrogen-containing compound is urea, thiourea, a methylol derivative of urea or thiourea, aniline, melamine, guanidine, guanamine or dicyandiamide.

7. The resin of claim 1 or 2 wherein the aldehyde is substantially formaldehyde.

8. The resin of claim 1 or 2 wherein the aldehyde is formaldehyde, the phenol is phenol and the nitrogen-containing compound is urea.

9. The resin of claim 1 or 2 at least 30% of which consists of spherical primary particles and the secondary agglomerated particles thereof, each of the particles having a particle diameter of 0.1 to 100 microns.

10. The resin of claim 1 or 2 at least 50% of which consists of spherical primary particles and the secondary agglomerated particles thereof, each having a particle diameter of 0.1 to 100 microns.

11. The resin of claim 1 or 2 70 to 100% of which consists of spherical primary particles and the secondary agglomerated particles thereof, each having a particle diameter of 0.1 to 100 microns.

12. The resin of any claim 1 which has such a size that at least 70% by weight thereof can pass through a 150 Tyler mesh sieve.

13. The resin of claim 1 which has such a size that at least 80% by weight thereof can pass through a 150 Tyler mesh sieve.

14. The resin of claim 1 which has a free phenol content, determined by liquid chromatography, of not more than 40 ppm.

15. The resin of claim 1 which has a free phenol content, determined by liquid chromatography, of not more than 20 ppm.

16. The resin of claim 2 wherein the $D_{1280-1360}/D_{1450-1500}$ ratio is 0.4 to 2.0.

17. The resin of claim 2 wherein the $D_{1280-1360}/D_{1450-1500}$ is 0.7 to 1.5.

18. The resin of claim 1 wherein the $D_{960-1020}/D_{1450-1500}$ ratio is 0.15 to 0.6.

19. The resin of claim 1 wherein the $D_{960-1020}/D_{1450-1500}$ ratio is 0.2 to 0.4.

20. The resin of claim 1 which has a phenol moiety content of 30 to 80% by weight.

21. The resin of claim 1 which has a phenol moiety content of 45 to 70% by weight.

22. The resin of claim 1 which contains at least 1% by weight of nitrogen.

23. The resin of claim 1 which contains 2 to 30% by weight of nitrogen.

24. The resin of claim 1 which has a solubility in methanol, as defined in the body of the specification, of not more than 20% by weight.

25. The resin of claim 1 which, when maintained at 100° C. for 5 minutes in accordance with the method for measuring heat fusibility described in the body of the specification, is at least partly fused.

26. The resin of claim 1 which, when maintained at a temperature of 100° C. for 5 minutes in accordance with the method for measuring heat fusibility described in the body of the specification, is not substantially melted nor fused.

27. A process for producing a granular or powdery nitrogen-containing phenol-aldehyde copolymer resin, which comprises contacting a phenol and a nitrogen-containing compound having at least two active hydrogen atoms with a hydrochloric acid-formaldehyde bath containing 3 to 28% by weight of hydrochloric acid, 3 to 25% by weight of formaldehyde and 0 to 10% by weight of another aldehyde with the total concentration of hydrochloric acid and formaldehyde being 10 to 40% by weight, while maintaining a bath ratio, defined by the quotient of the weight of the hydrochloric acid-formaldehyde bath divided by the total weight of the phenol and the nitrogen-containing compound, of at least 8, said contacting being effected such that after contacting of the phenol and the nitrogen-containing compound with the bath, white suspended particles are formed and thereafter developed into a granular or powdery solid.

28. The process of claim 27 wherein the nitrogen-containing compound is used in an amount of 5 to 75% by weight based on the total weight of the phenol and the nitrogen-containing compound.

29. The process of claim 27 or 28 wherein the nitrogen-containing compound is used in an amount of 15 to 65% by weight based on the total weight of the phenol and the nitrogen-containing compound.

30. The process of claim 27 wherein the nitrogen-containing compound is used in a proportion of 25 to 55% by weight based on the total weight of the phenol and the nitrogen-containing compound.

31. The process of claim 27 wherein the concentration of hydrochloric acid in the hydrochloric acid-formaldehyde bath is 8 to 25% by weight.

32. The process of claim 27 wherein the concentration of hydrochloric acid in the hydrochloric acid-formaldehyde bath is 12 to 22% by weight.

33. The process of claim 27 wherein the concentration of formaldehyde in the hydrochloric acid-formaldehyde bath is 5 to 20% by weight.

34. The process of claim 27 wherein the concentration of formaldehyde in the hydrochloric acid-formaldehyde bath is 7 to 15% by weight.

35. The process of claim 27 wherein the total concentration of hydrochloric acid and formaldehyde in the hydrochloric acid-formaldehyde bath is 15 to 35% by weight.

36. The process of claim 27 wherein the total concentration of hydrochloric acid and formaldehyde in the hydrochloric acid-formaldehyde bath is 20 to 32% by weight.

37. The process of claim 27 wherein the bath ratio is maintained at 10 or higher.

38. The process of claim 27 wherein the bath ratio is maintained at 15 to 40.

39. The process of claim 27 wherein formaldehyde in the hydrochloric acid-formaldehyde bath is supplied from formalin, trioxane, tetraoxane or paraformaldehyde.

40. The process of claim 27 wherein the hydrochloric acid-formaldehyde bath contains another aldehyde selected from the group consisting of monofunctional aliphatic aldehydes having 2 to 4 carbon atoms, glyoxal, furfural and benzaldehyde.

41. The process of claim 27 wherein the phenol is phenol, m-cresol, or a mixture of phenol and another phenol.

42. The process of claim 41 wherein the other phenol is o-cresol, m-cresol, p-cresol, bisphenol A, and o-, m- or p-($C_2$-$C_4$ alkyl)phenol, p-phenylpyenol, xylenol, hydroquinone or resorcinol.

43. The process of claim 27 wherein the nitrogen-containing compound has at least one group having active hydrogen atoms selected from the class consisting of amino groups, amide groups, thioamide groups, ureylene groups and thioureylene groups.

44. The process of claim 43 wherein the nitrogen-containing compound is urea, thiourea, a methylol derivative of urea or thiourea, aniline, melamine, guanidine, guanamine or dicyandiamide.

45. The process of claim 27 wherein the aldehyde contained in the hydrochloric acid-formaldehyde bath is substantially formaldehyde, the phenol is substantially phenol, and the nitrogen-containing compound is substantially urea.

46. The process of claim 27 wherein the contacting of the hydrochloric acid-formaldehyde bath with the phenol and the nitrogen-containing compound is effected such that first a clear solution is formed by adding the phenol and the nitrogen-containing compound to the hydrochloric acid-formaldehyde bath, and then white suspended particles are formed and thereafter developed into a granular or powdery solid.

47. The process of claim 27 wherein the contacting of the hydrochloric acid-formaldehyde bath with the phenol and the nitrogen-containing compound is effected such that first a clear solution is formed by dissolving the nitrogen-containing compound in the hydrochloric acid-formaldehyde bath and then adding the phenol, and then white suspended particles are formed and thereafter developed into a granular or powdery solid.

48. The process of claim 27 or 47 wherein before the white suspended particles are formed after the addition of the phenol and the nitrogen-containing compound to the hydrogen hydrochloric acid-formaldehyde bath, the bath is stirred to form a uniform clear solution.

49. The process of any one of claims 27, 46, 47 or 48 wherein from the time of formation of the white suspended particles subsequent to the addition of the phenol and the nitrogen-containing compound to the hydrochloric acid-formaldehyde bath until the white suspended particles are developed into a solid, the bath is not subjected to a mechanical shear force.

50. The process of claim 27 wherein the hydrochloric acid-formaldehyde bath is maintained at a temperature of 90° C. or lower, and the phenol and the nitrogen-containing compound are added to it.

51. The process of claim 27 wherein the hydrochloric acid-formaldehyde bath is maintained at a temperature of not more than 70° C., and the phenol and the nitrogen-containing compound are added to it.

52. The process of claim 27 wherein the phenol, either alone or with the nitrogen-containing compound, is diluted with water or an aqueous solution of formaldehyde in a concentration of not more than 44% by weight, and the diluted solution of the phenol or both the phenol and the nitrogen-containing compound is added to the hydrochloric acid-formaldehyde bath while exercising such a control that upon the addition of the diluted solution, the composition of the bath is as defined in any one of claims 26, 30 and 31.

53. The process of claim 52 wherein the aqueous solution is a formalin having a concentration of 20 to 40% by weight.

54. The process of claim 52 or 53 wherein the concentration of the phenol or both the phenol and the nitrogen-containing compound in the diluted solution is 10 to 95% by weight.

55. The process of claim 54 wherein the concentration of the phenol in the diluted solution of the phenol is 70 to 90% by weight.

56. The process of claim 54 wherein the total concentration of the phenol and the nitrogen-containing compound in the diluted solution of these is 25 to 70% by weight.

57. The process of claim 27 wherein the hydrochloric acid-formaldehyde bath is maintained at a temperature of not more than 40° C.; the nitrogen-containing compound is dissolved in the bath and then the phenol, either as such or after being diluted with the aforesaid aqueous formaldehyde solution, to form a clear solution, or a clear solution is formed by adding both the phenol and the nitrogen-containing compound, either as such or as the diluted solution; and then, white suspended particles are formed in the clear solution; and thereafter, the bath is heated to at least 70° C. before the completion of the reaction.

58. The process of claim 57 wherein the hydrochloric acid-formaldehyde bath is maintained at a temperature of 15° to 35° C., the nitrogen-containing compound is dissolved in the bath, and then the phenol or a diluted solution of the phenol in an aqueous formaldehyde solution is added to form a clear solution, or the phenol and the nitrogen compound are added either as such or as the diluted solution to the bath.

59. The process of claim 57 or 58 wherein the temperature of the hydrochloric acid-formaldehyde bath is maintained at not more than 40° C., and substantially all of the phenol and the nitrogen-containing compound are added to the bath to form a clear solution with or without stirring, and white suspended particles are formed in it in the absence of stirring.

60. The process of claim 27 wherein the temperature of the hydrochloric acid-formaldehyde bath is maintained at not more than 40° C., preferably 15° to 35° C., and substantially all of the phenol and the nitrogen-containing compound are added to the bath with stirring to form a clear solution, and thereafter white suspended particles are formed in the absence of stirring and then developed into a granular or powdery solid with or without temperature elevation, followed by maintaining the solid at a temperature of not more than 50° C.

61. The process of claim 27 wherein the temperature of the hydrochloric acid-formaldehyde bath is maintained at not more than 40° C., preferably 15° to 35° C., and substantially all of the phenol and the nitrogen-containing compound are added to the bath with stirring to form a clear solution, and thereafter white suspended particles are formed in the absence of stirring and then developed into a granular or powdery solid with or without temperature elevation, followed by heating the solid at a temperature higher than 50° C., preferably 70° to 95° C.

62. The process of claim 27 wherein the temperature of the hydrochloric acid-formaldehyde bath is maintained at 35° C. or higher, preferably higher than 40° C. but not higher than 95° C., and the nitrogen-containing compound is dissolved in the bath and the phenol either as such or diluted with an aqueous solution of formaldehyde is added gradually in the form of fine streams or liquid droplets to the bath, or the diluted solution of the phenol and the nitrogen-containing compound are gradually added in the form of fine streams or liquid droplets and white suspended particles are formed continuously within several minutes after the contacting of the fine streams or liquid droplets with the bath or as soon as the contacting is effected, and then if the initial temperature of the bath is not more than 60° C., it is heated to 70° to 95° C.

63. The process of claim 61 wherein the hydrochloric acid-formaldehyde bath is maintained at a temperature of 60° to 95° C., the nitrogen-containing compound is dissolved in the bath, then, phenol or its diluted solution is gradually added in the form of fine streams or liquid droplets, or the diluted solution of the phenol and the nitrogen-containing compound is added gradually in the form of fine streams or liquid droplets to the bath to form white suspended particles which are then developed into a granular or powdery solid.

64. The process of claim 27 wherein the granular or powdery nitrogen-containing phenol-aldehyde copolymer resin obtained by the process of any one of claims 26 to 61 is separated from the hydrochloric acid-formaldehyde bath, washed with water, treated with an aqueous solution of an alkali to neutralize the adhering hydrochloric acid, and further washed with water.

65. The process of claim 64 wherein the aqueous solution of an alkali is an aqueous solution of ammonia.

66. The process of claim 64 wherein the aqueous solution of an alkali is a methanolic aqueous solution of ammonia.

67. The process of claim 64 wherein the concentration of the aqueous alkali solution is 0.1 to 5% by weight, preferably 0.3 to 3% by weight.

68. The process of claim 66 wherein the concentration of methanol is 20 to 80% by weight, preferably 35 to 60% by weight.

69. The process of claim 64 wherein the neutralization with the aqueous solution of an alkali is carried out at a temperature of 20° to 90° C., preferably 40° to 70° C.

* * * * *